(12) United States Patent
Weisser et al.

(10) Patent No.: US 7,227,816 B2
(45) Date of Patent: Jun. 5, 2007

(54) CONTAINER FOR OPTICAL DISKS, TRAY AND MAGAZINE TYPE PLAYER THEREFOR

(75) Inventors: Fritz Weisser, St. Georgen (DE); Hans-Joachim Platte, Hemmingen (DE); Wilfried Scheffler, Donaueschingen (DE); Billy Wesley Beyers, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 84 days.

(21) Appl. No.: 10/182,488

(22) PCT Filed: Feb. 8, 2001

(86) PCT No.: PCT/EP01/01391

§ 371 (c)(1),
(2), (4) Date: Jul. 30, 2002

(87) PCT Pub. No.: WO01/59787

PCT Pub. Date: Aug. 16, 2001

(65) Prior Publication Data

US 2003/0011286 A1    Jan. 16, 2003

(30) Foreign Application Priority Data

Feb. 8, 2000    (WO) .................... PCT/EP 00/00988

(51) Int. Cl.
*G11B 23/03*    (2006.01)

(52) U.S. Cl. ................................. 369/30.77

(58) Field of Classification Search ............ 369/30.77, 369/30.68; 360/133; 720/732, 634
See application file for complete search history.

(56) References Cited

U.S. PATENT DOCUMENTS

| | | | |
|---|---|---|---|
| 4,138,703 A * | 2/1979 | Stave et al. ................. | 360/133 |
| 4,768,116 A | 8/1988 | Watanabe .................... | 360/90 |
| 5,127,716 A | 7/1992 | Caspers et al. | |
| 5,293,293 A * | 3/1994 | Iwata et al. ................. | 360/133 |
| 5,366,073 A | 11/1994 | Turrentine et al. .......... | 206/309 |

(Continued)

FOREIGN PATENT DOCUMENTS

DE    19758211    7/1999

(Continued)

OTHER PUBLICATIONS

Patent Abstracts of Japan, vol. 018, No. 665, Dec. 25, 1994 & JP 6-259914.

(Continued)

*Primary Examiner*—Tianjie Chen
(74) *Attorney, Agent, or Firm*—Joseph J. Laks; Harvey D. Fried; Patricia Verlangieri

(57) ABSTRACT

The invention refers to a container (1) for optical disks (25), a tray (5) for such container (1) and a magazine type player (39) adapted to be used with such container (1). Object of the invention is to provide a container (1) for optical disks (25) in which many disks (25) may be stored within a comparatively small space. According to the invention the container (1) comprises a slidable tray (5), guiding means (10) for guiding said tray (5), a cover plate (6) and a bottom plate (2), wherein the thickness of said tray (5) substantially equals the sum of thicknesses of said cover plate (6) and said bottom plate (2).

50 Claims, 17 Drawing Sheets

U.S. PATENT DOCUMENTS

Figure 1:
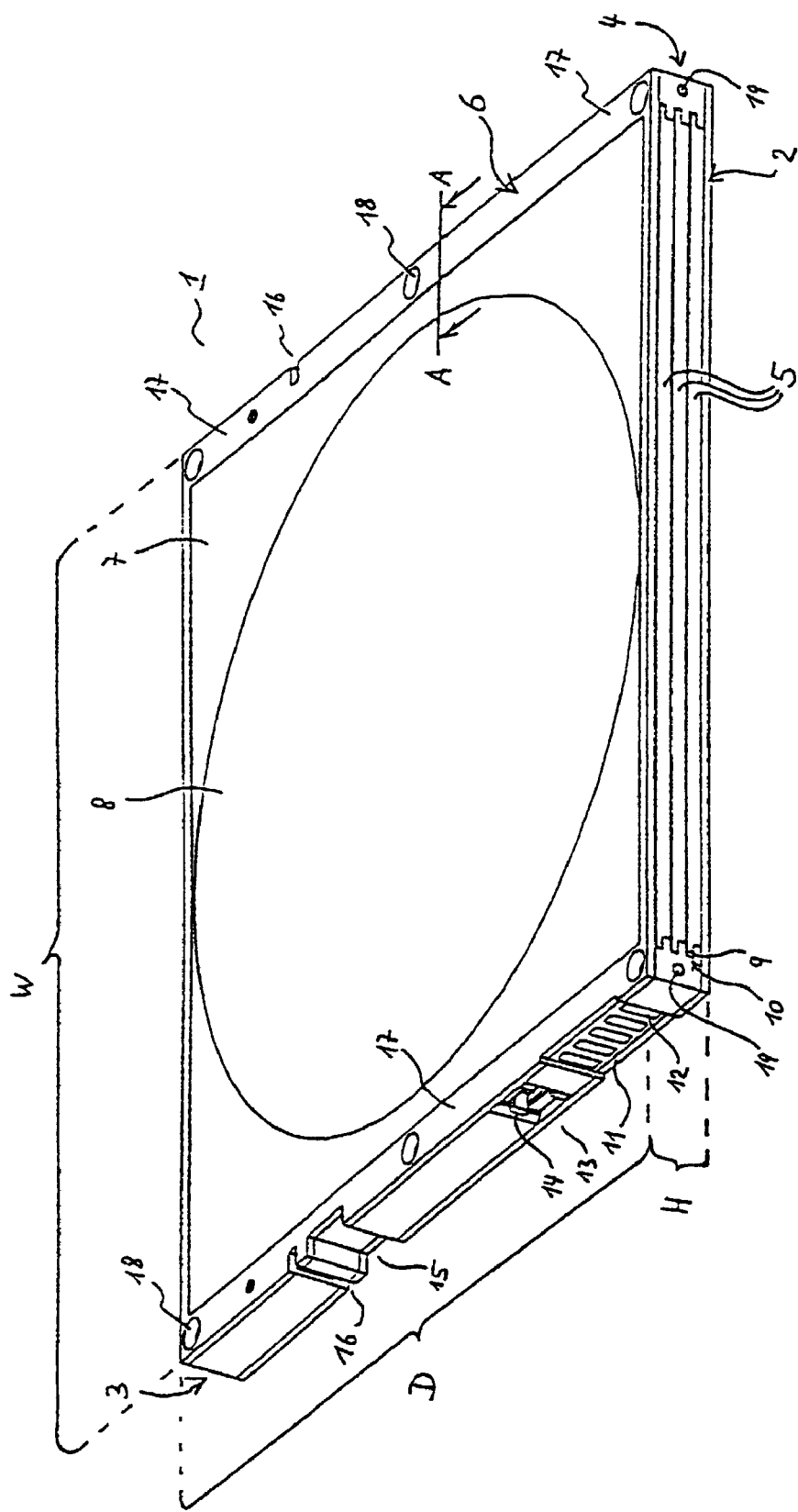

| | | | |
|---|---|---|---|
| 5,563,855 A | 10/1996 | Nakase et al. | 369/32 |
| 5,818,802 A | 10/1998 | Menke et al. | 369/36 |
| 5,936,935 A * | 8/1999 | Hanakawa et al. | 720/732 |
| 5,975,291 A | 11/1999 | Attar et al. | 206/310 |
| 6,031,811 A | 2/2000 | Umesaki et al. | 369/178 |
| 6,285,648 B1 * | 9/2001 | Philipps | 369/200 |
| 6,600,702 B2 * | 7/2003 | Sato et al. | 369/30.68 |
| 6,697,319 B2 * | 2/2004 | Takai | 720/634 |
| 6,813,113 B1 * | 11/2004 | Mueller et al. | 360/92 |

FOREIGN PATENT DOCUMENTS

| | | |
|---|---|---|
| EP | 702365 | 3/1996 |
| EP | 717405 | 6/1996 |
| EP | 833327 | 4/1998 |
| EP | 833332 | 4/1998 |
| EP | 866452 | 9/1998 |
| JP | 6-103672 | 4/1994 |
| JP | 6-259914 | 9/1994 |
| JP | 10-031856 | 2/1998 |

OTHER PUBLICATIONS

Patent Abstracts of Japan, vol. 018, No. 379, Jul. 15, 1994 & JP 6 103672.

Patent Abstracts of Japan, vol. 1998, No. 6, Apr. 30, 1998 & JP 10-031856.

* cited by examiner

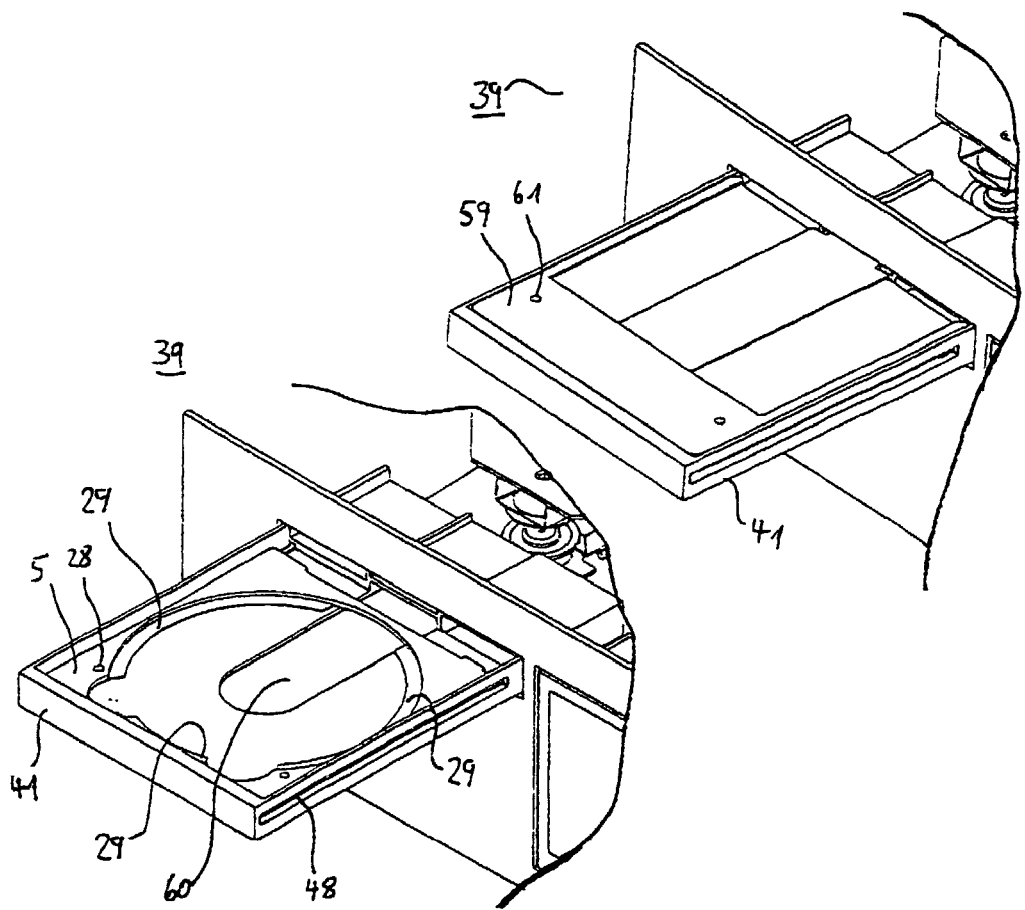
Fig. 8
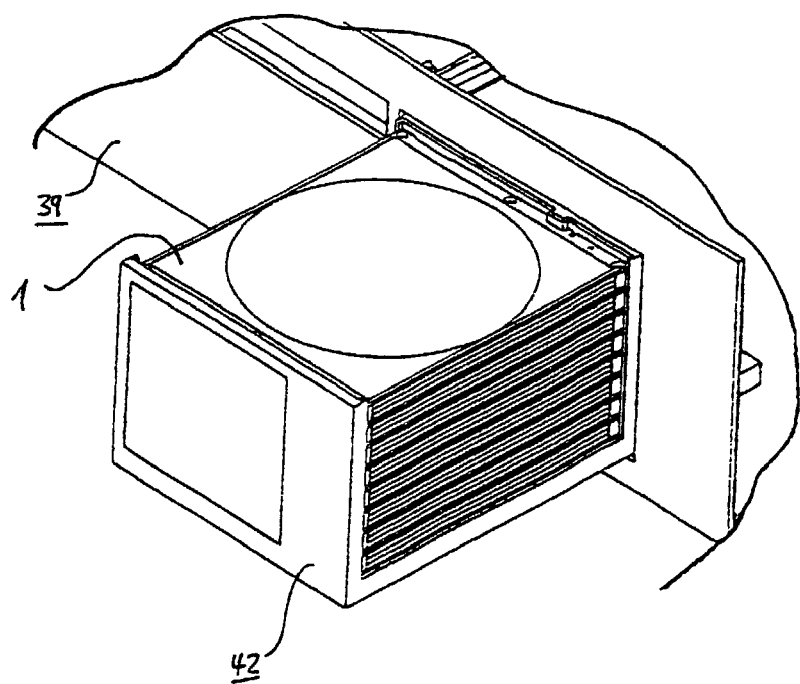
Fig. 9
Fig. 10

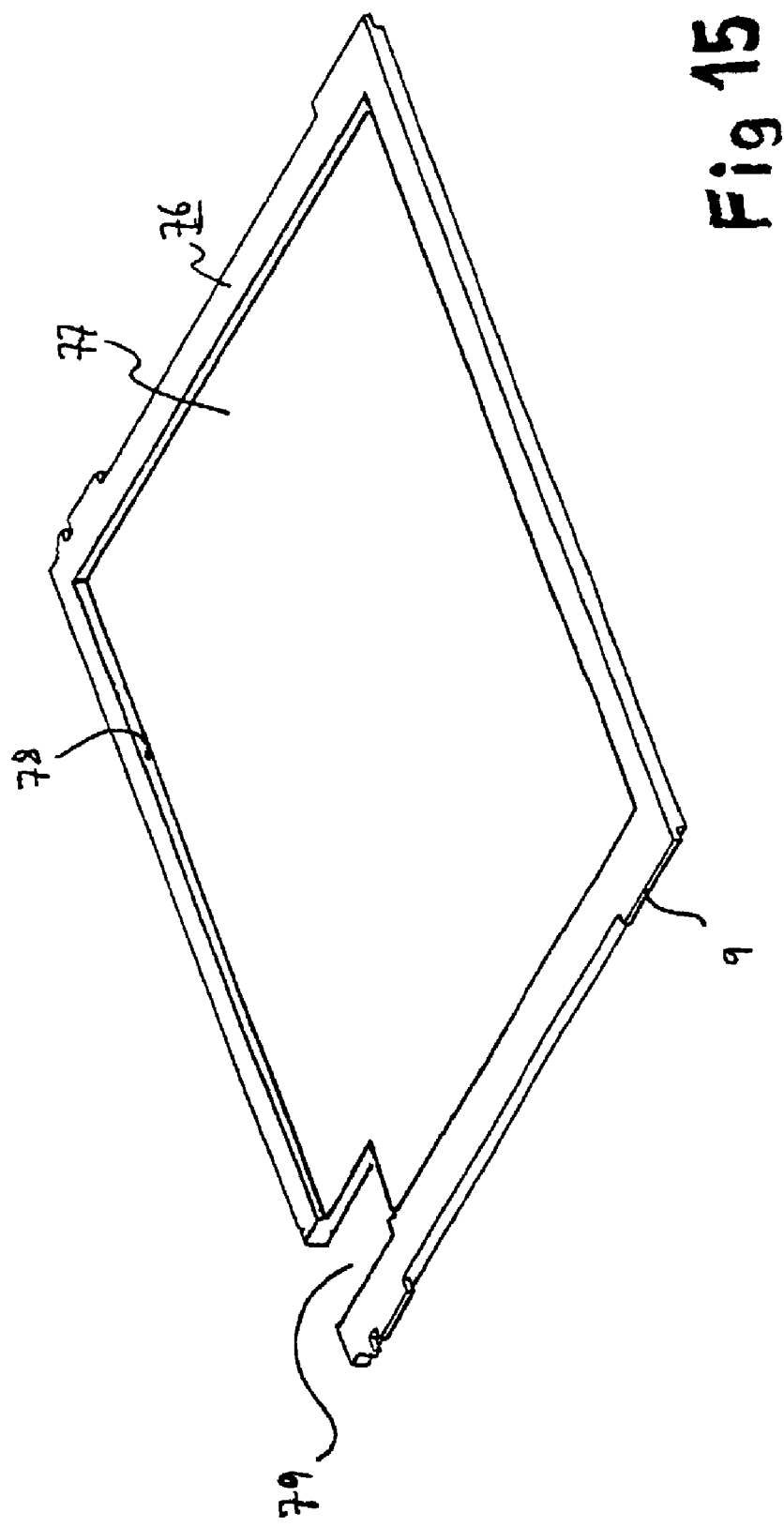

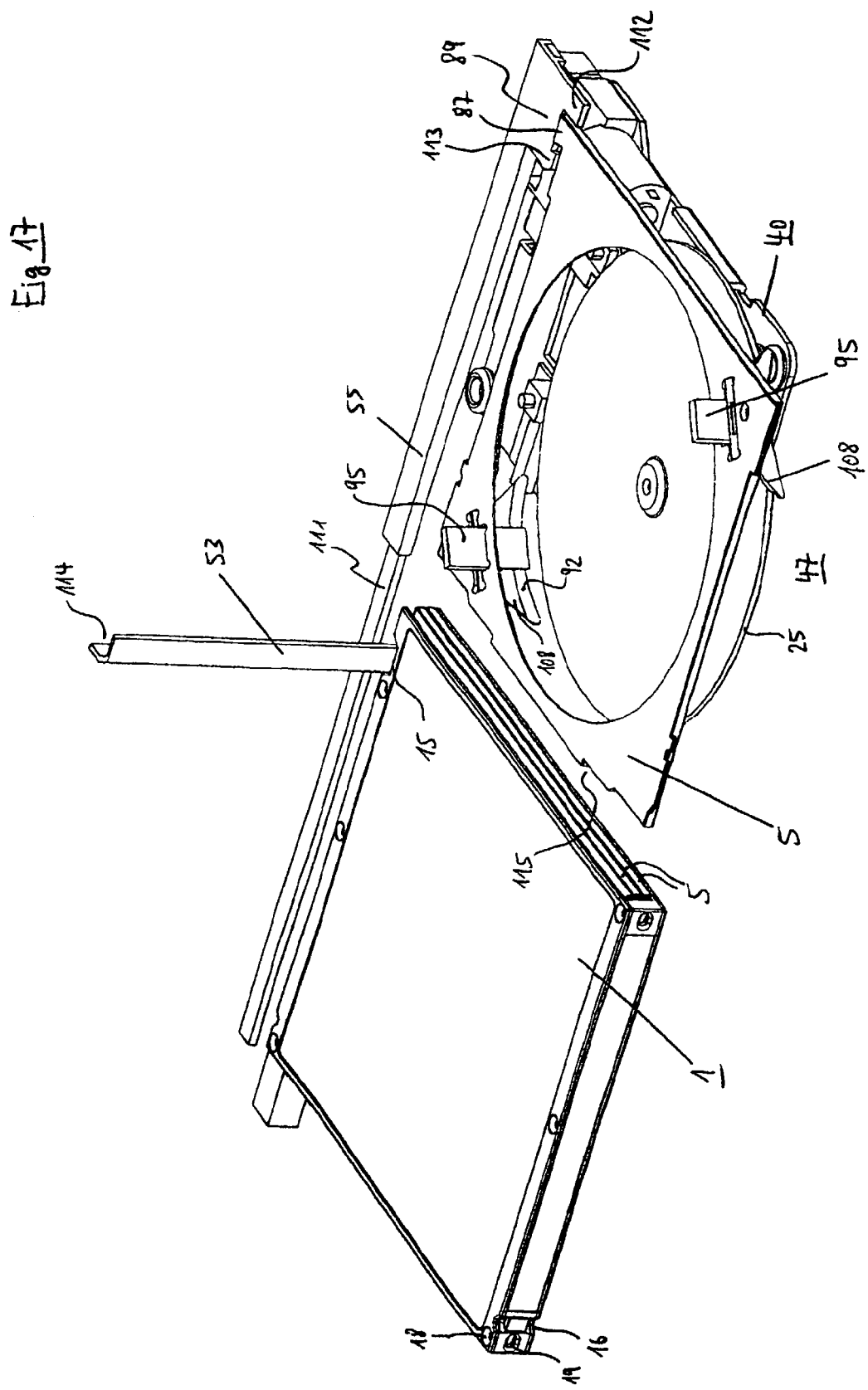

CONTAINER FOR OPTICAL DISKS, TRAY AND MAGAZINE TYPE PLAYER THEREFOR

This application claims the benefit, under 35 U.S.C. § 365 of International Application PCT/EP01/01391, filed Feb. 8, 2001, which was published in accordance with PCT Article 21(2) on Aug. 16, 2001 in English and which claims the benefit of PCT patent application No. PCT/EP00100988 filed Feb. 8, 2000.

The invention refers to a container for optical disks, a tray for such container and a magazine type player adapted to be used with such container.

Containers for optical disks are known e.g. from U.S. Pat. No. 5,936,935, EP-A-0 833 332, U.S. Pat. No. 5,975,291, DE-A-197 58 211 or U.S. Pat. No. 5,366,073. For stability reasons all of these known containers either have sum of bottom plate thickness and cover plate thickness larger than thickness of a single tray or, in case of a tray being largely removeable from the container, the tray thickness is larger than the sum of bottom and cover plate thicknesses.

Object of the invention is to provide a container for optical disks in which many disks may be stored within a comparatively small space.

A container for optical disks according to the invention comprises a slidable tray, guiding means for guiding said tray, cover plate and bottom plate, wherein the thickness of said tray substantially equals the sum of thicknesses of said cover plate and said bottom plate.

Preferably a container according to the invention contains three trays.

The outer dimensions of the container according to the invention substantially equal those of a standard Jewel box or a standard DVD storage box. The container height is thus about 10 mm, its depth is about 125 mm and its width is about 142 mm. Each tray has a height of about 2.5 mm while the sum of thicknesses of bottom and cover plate is also about 2.5 mm. This has the advantage, that it fits to existing storage means, and that no compatibility problems occur.

Preferably, the container according to the invention comprises an opening for storing additional items. This has the advantage, that information material, for example a booklet regarding the content of a stored optical disk, a respective cover sheet, a smart card being related to an optical disk stored in said container, or any other additional item may be stored in the container. This opening is preferably closed by a swinging door. According to another preferred solution, it consists of a slit through which the additional items may be accessed.

Advantageously the dimensions of bottom plate, cover plate and trays of a container according to the invention, at the outer surfaces, are dimensioned such to ensure dust protection. This keeps the optical disks safe from being destroyed or reduced in playability, similar to known disk storage boxes.

The container according to the invention is preferably open on both sides for play back. This has the advantage of improved accessibility, as trays can be accessed to from both sides.

A Container according to the invention is open at one side for insertion and removal of a tray and it is partially closed at the opposite side. This has the advantage that the mechanical stability of the container is increased in comparison to a container having two opposing open sides. On the other hand, the partial opening is advantageously used to push out a tray, either manually or automatically, to check content of filling state of the tray etc.

Preferably, the container according to the invention comprises releasable locking means for locking the trays in their position within the container. Transportation or other handling of the container is thus possible without the risk of unintentional opening and of loosing a disk.

According to the invention the container comprises an opening for releasing said locking means. This has the advantage of enabling access when needed, e.g. in a playback device or for the user's access.

Preferably the container comprises at least one orientation groove. This enables correct orientation in relation to a playback device and prevents unintentional wrong insertion.

Preferably the orientation groove is arranged near an edge of the container. This makes possible to access to a part of the tray via the orientation groove, e.g. for pushing or pulling out the tray or for checking whether a tray is inserted or not.

According to a preferred solution the container is provided with an identification area. This enables quick identification of the container and its content.

Preferably the container comprises support areas of defined thickness. The support areas are preferably arranged at at least three locations of cover plate and bottom plate. The support areas are of defined thickness and are co-acting in case of several containers according to the invention are stacked one upon the other in order to reduce height tolerances. The support areas are formed according to a first preferred embodiment by slight protrusions extending upwards from the cover plate and downwards from the bottom plate. According to a second preferred solution, the support areas are formed by protrusions on one of said cover plate and bottom plate while on the respective other plate the support area is formed by a slight depression. In this case the protrusion is slightly larger than the depression so that good contact is assured.

A container according to a preferred embodiment comprises connecting means for connecting two or more of said containers to one another. This has the advantage that secure and space saving storage and transport of such container is made possible.

Preferably the connecting means is one of clips, hinges, pins and magnets.

The container according to the invention preferably comprises a read-write protection means. This enables the user to select, in case of writable disks, which disk should be write protected.

According to a preferred solution at least one of cover plate and bottom plate of the container is made of transparent material. This has the advantage that it is easily inspectable whether a disk is contained within the container and which type of disk it is.

According to another advantageous solution at least one of cover plate and bottom plate of the container comprises a label area. This has the advantage that a label may be attached to the container. Said label area is preferably formed by a depression for sticking a label onto the container without increasing its thickness. According to a preferred solution the surface of label area and label are arranged such that the label, on the one hand, sticks properly to the label area, and that it, on the other hand, can be removed from that label area without problems and without leaving particles on said label area.

The container according to the invention is, in top view, of rectangular shape, having first and second base lines. The first base line is shorter than the second base line and the first base line is less than 5% larger than the diameter of the largest optical disk to be stored within the container. The second base line is less than 20% larger than the diameter of the largest optical disk to be stored within the container. The container is provided with side walls being arranged at the outer ends of the second base line and extending in direction of the first base line. The container further is provided with openings being arranged between the side walls and extending along the second base line, said openings being closed by side surfaces of trays which are accommodated within the container, said side surfaces of said trays, and surfaces of side walls and end surfaces of bottom plate and cover plate forming a substantially even plane.

The container according to the invention is provided with a first locking means which is arranged to lock and unlock all of the trays stored within the container, and with second locking means for locking and releasing each single tray independently of the other trays. This has the advantage, that, in case that the user wants to access to the trays, a certain tray to be accessed to can be defined and unlocked accordingly. For safety reasons, first and second locking means need to be actuated at the same time in order to release a tray. This prevents unintentional release of a tray by actuating one of the locking means by chance.

Preferably the container comprises a centering element for centering a play-back device with regard to the trays. This has the advantage that the centering element, for example a hole, preferably having conical form, cooperates with a respective part of a play back device in order to assure correct relative positioning of play back device and container.

A tray for container for optical disk according to the invention has a thickness of substantially the sum of container cover plate and bottom plate thicknesses and comprises gripping holes, support areas for supporting an optical disk at the lower surface of its outer rim, an opening in said support area for enabling access up to the radially outwardly area of an optical disk, the upper surface of said support area rising in cross sectional view from its radially inner end to its radially outer end, guiding means for guiding the tray within the container and an orientation hole. The guiding means are arranged in asymmetric way in order to form a fail-safe means for the orientation of the tray when being input into the container. The guiding means are, according to a preferred solution, projections, which cooperate with guide rails of the side walls of the container. The orientation or centering hole is similar to the one provided by the DVD-RAM standard or another standard for correct orientation of the tray within a scanning device.

A tray for a container for optical disk according to the invention comprises a support area for supporting an optical disk at the lower surface of its outer rim and a releasable disk holder for holding an optical disk at the upper surface of its outer rim. This has the advantage that the disk is kept at the tray even if the tray is taken out of the magazine in an upside down manner. Without a disk holder a user has to handle carefully when removing a tray from the container in order to prevent the disk from falling off the tray. Orientation of tray, be it horizontally, upside down, vertically or any other orientation, is now possible without the risk of the disk falling off when a tray is remove from or inserted into the container. The support area may of course also support the disk at its upper surface while its lower surface is held by the disk holder. A single holder is sufficient to hold the disk sufficiently. However, at least two disk holders are preferred as these might be made smaller and of less stable or strong material, thus being cheaper to produce. A preferred solution is to provide four disk holders arranged in the area of the four edges of a rectangularly shaped tray in order to keep stability of tray and disk holder as large as possible.

A tray according to the invention is provided with a disk holder being arranged to perform a swinging movement, i.e. a movement out of the plane of the tray, or a rotating movement, i.e. a movement within the plane of the tray. This solution needs less space for fixation at the tray and for movement, thus allowing for high stability of the tray compared to a linear movement. Such disk holder is easy to implement at an edge area of a rectangular tray, having a circular recess for storing a circular disk.

Preferably the disk holder is applied with a position fixing means, e.g. a spring element or a snap element. This is an easy way to fix the disk holder in its release and/or in its holding position.

Advantageously the disk holder has a first actuating face for being actuated by first actuating means and a second actuating face for being actuated by second actuating means. Respective actuating faces are optimized for respective actuating means as e.g. different automatic actuation devices or manual and automatic actuation. Manual actuation occurs for example when the tray is removed from a container in order to insert, remove or change a disk in the tray. Automatic actuation occurs for example for releasing a disk in order to allow rotation for playing the disk or for automatically changing the disk or to affix the disk at the tray for returning the tray back to the container after playback.

The disk holder preferably has a first actuation edge for being actuated in a disk release position and a second actuation edge for being actuated in a disk holding position. These actuation edges are preferably parts of the first actuation face allowing for easy push operation of the disk holder.

According to the invention the disk holder comprises two arms being pivotably connected to the tray. One of these arms has a disk holding area and each arm has an actuation edge. The actuating edges are preferably arranged at parts of the arms remote from their pivot axis. In case of a tray for a smaller diameter disk one arm is designed longer in order to reach more radially inwardly while the actuating edges are arranged at similar positions as for a normal diameter disk. This increases interoperability.

Another tray for a container for optical disks according to the invention has a thickness of substantially the sum of container cover plate and bottom plate thicknesses and comprises a base plate, being surrounded by vertically extending side walls, two of it being provided with guiding means for guiding the tray within the container and an identification opening for identifying the tray as a none disk containing tray. This type of tray may contain a booklet or any other additional items, which are related to one of the disks contained in the container. This tray is arranged atop the other trays, directly below the cover plate of the container. In this way the volume defined by cover plate, side walls and base plate of the tray is completely isolated from the optical disks, so that none of the items stored in this volume may be mechanically influenced by said items.

An adapter for a tray of a disk storage container according to the invention comprises an outer shape to fit in said tray, gripping holes and an inner support area for supporting an optical disk at the lower surface of its outer rim, an outer support area for being supported by a support area of said tray. The upper surface of said inner support area rises in cross sectional view from its radially inner end to its radially outer end. An opening within said support area is enabling access to the radially outwardly area of a disk, the adapter being asymmetric. The asymmetric shape of the adapter prevents an unintentional wrong oriented insertion of the adapter into a tray. The adapter provides for a small diameter disk being stored in the container.

An adapter according to the invention preferably comprises a disk holder as described above.

A magazine type player and/or recorder according to the invention comprises an optical pick-up unit, a magazine tray for accommodating at least one container, the magazine tray having an orientation rib, a slider for removing a single tray out of said container and for moving said tray into a tray receiving portion of said optical pick-up unit, said slider and optical pick-up unit forming a single vertically movable unit. This has the advantage, that containers according to the invention can be used and that, because of their small size, a large capacity magazine type device is formed the size of which is very small.

Said optical pick-up unit preferably comprises a drawer for receiving a single disk or a cartridge, which drawer is also suited for receiving a tray from a container. This has the advantage, that said single drawer is usable for different types of recording media independent from their individual packaging.

According to the invention, the magazine type player comprises a slider having a pushing element and a push-pull element or just a push-pull element. These elements are used for moving a tray from a container to the drawer and vice versa.

Advantageously, the push-pull element comprises a pull lever having a pulling nose and being guided into a contact position by means of a guiding element of the tray. This ensures reliable movement of the tray. The pull lever is for example guided by a cam. According to another solution of the invention, the pull lever is prestressed by a spring and is guided by the pulling nose being forced by the spring to be in contact with neighbouring elements while, for moving the pull lever against the spring force, cooperation e.g. of the nose with neighboured elements is used, too.

The push-pull element further comprises a push nose. This enables easy pushing action for bringing a tray back to its rest position within the container.

The pushing element is preferably connected to a pushing means. This has the advantage, that in case of incorrect adjustment and blocking caused thereby, the pushing element is moved independently from the slider, so that no destruction can be caused. However, the pushing element is still able to push thanks to the pushing element. Said pushing means is for example a spring.

The pushing element preferably comprises a sensor for sensing a movement of the pushing element. This sensor is preferably a light barrier.

The pushing element comprises further a sensor for sensing contact with an element of the magazine. This sensor might be a pressure sensor. Both sensors make possible to check the availability of a moveable tray and other circumstances, so that control of the device is made secure and easy.

The orientation rib and the pulling nose of the magazine type player advantageously reach into an orientation groove of a container stored within the magazine type player. Thus the pulling nose may freely slide within the orientation groove without necessity to arrange for additional space for movement.

Advantageously, the tray receiving portion of the drawer comprises a guiding slot for adjusting the vertical tray position. This enables exact positioning of a tray when being inserted into or removed from the drawer.

The tray receiving portion advantageously comprises a tray holder for holding a tray in a remote position from the disk play position. Play position means, here and throughout the whole text, position for playback as well as for recording of the disk. It may also mean that the disk is in a position on the drawer even if it is not actually played or recorded. Holding the tray in a remote position from the play position prevents any undesired interference between playing means such as pickup, drive motors etc. and the tray. This increases freedom of choice of parts used to build the device. The tray holder may make use of a clipping or snapping connection, magnetic force or any other suitable fixation.

Preferably the tray receiving portion comprises a disk release pin for releasing the disk from its position at the tray.

Advantageously the tray receiving portion comprises a disk release ring for actuating a disk release pin for rotatingly moving one or several disk release pins in order to release the disk from the tray.

The magazine type player according to the invention preferably is provided with second sliding means and second optical pick-up means wherein said second sliding means being arranged for moving a tray to or removing a tray from said second optical pick-up unit means. This allows independent access of two independent scanning devices to a single stack of containers, i.e. to a single magazine.

Preferably there is provided means for reading out or writing to an identification area of said container. This has the advantage, that content information or user defined information or any other useful information is stored within and accessed from the container.

Advantageously the magazine type player according to the invention comprises means for storing and keeping said read out information.

The magazine type player further preferably comprises means for creating for and assigning to a container a unique identification code. This makes it possible to identify certain containers and their respective content.

Preferably, the optical pick-up unit comprises two optical scanners, for accessing top side and bottom side of an optical disk at one time. This speeds up access and makes possible to read or write double sided disks without necessity to turn the disk upside down.

The magazine type player according to the invention preferably comprises a transparent window for enabling view to containers being stored within said player. This window is advantageously arranged at the front wall of a magazine tray of the device. This has the advantage that it enables a user of the device to easily check the content of the magazine tray as the label areas of the containers being stored within the magazine tray are directly visible through said window.

Advantageously the pushing element of the tray moving mechanics of the player is provided with a first leg for coacting with said slider and with a second leg for coacting with said tray wherein said second leg is arranged to contact said tray substantially in the middle area of said tray. This has the advantage that the tray is pushed at its middle area which reduces the probability of tilt. A further advantage lies in the fact that the second leg, when being inserted into the container, acts as a fixing means for a disk being stored in the tray below the actually moved out tray. Even in case of vibrations or other mechanical disturbances the disk is securely held in its rest position on the respective tray.

Further advantages can be seen from the figures and the following description of preferred embodiments. The invention, however, is not restricted to these embodiments. Measures within the range of a skilled person are also covered by the invention.

Figure 2:
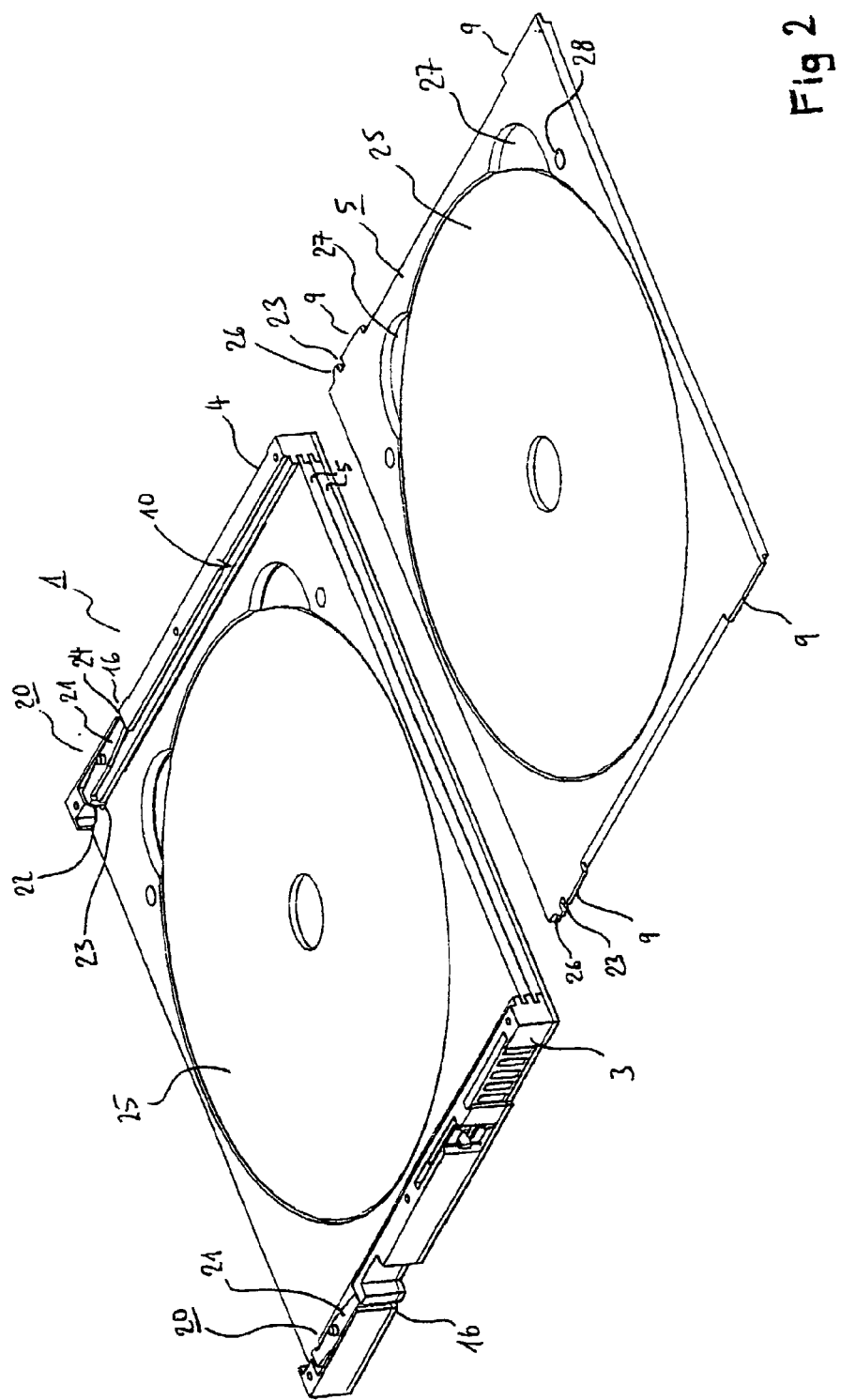
Figures 1A, 3:
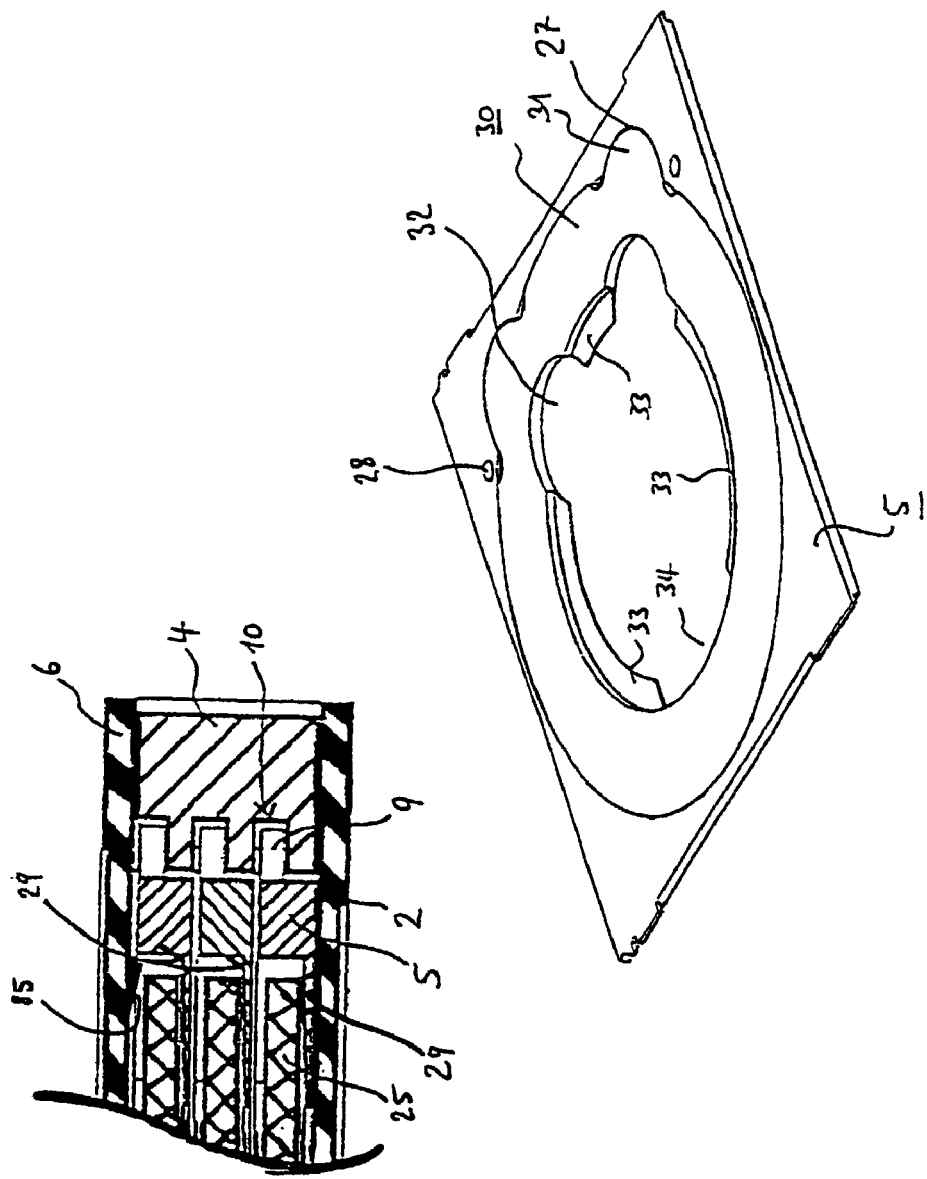
Figure 4:
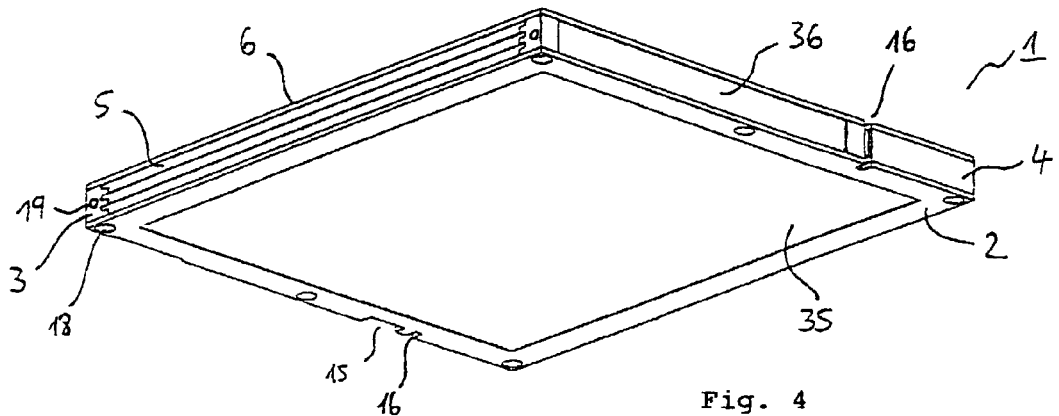
Figure 5:
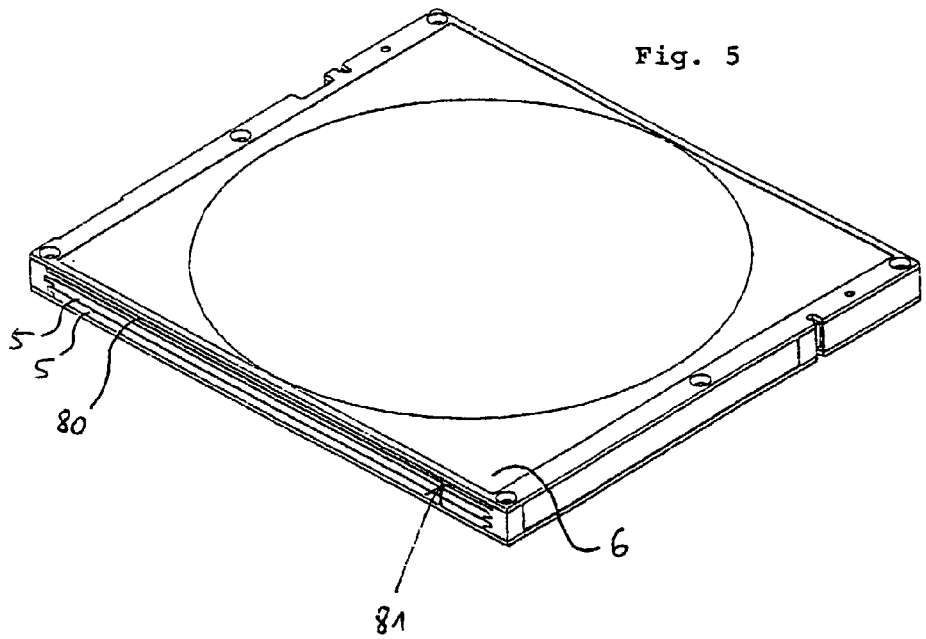
Figure 16:
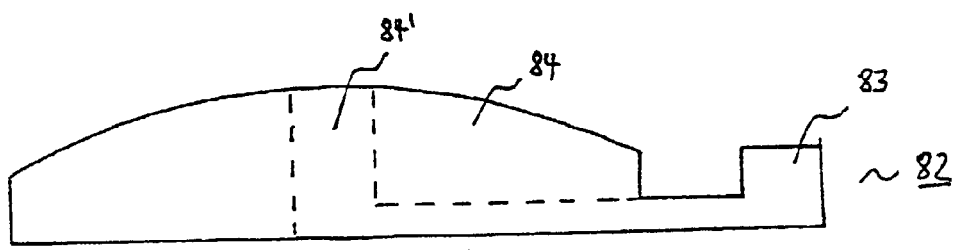
Figure 6:
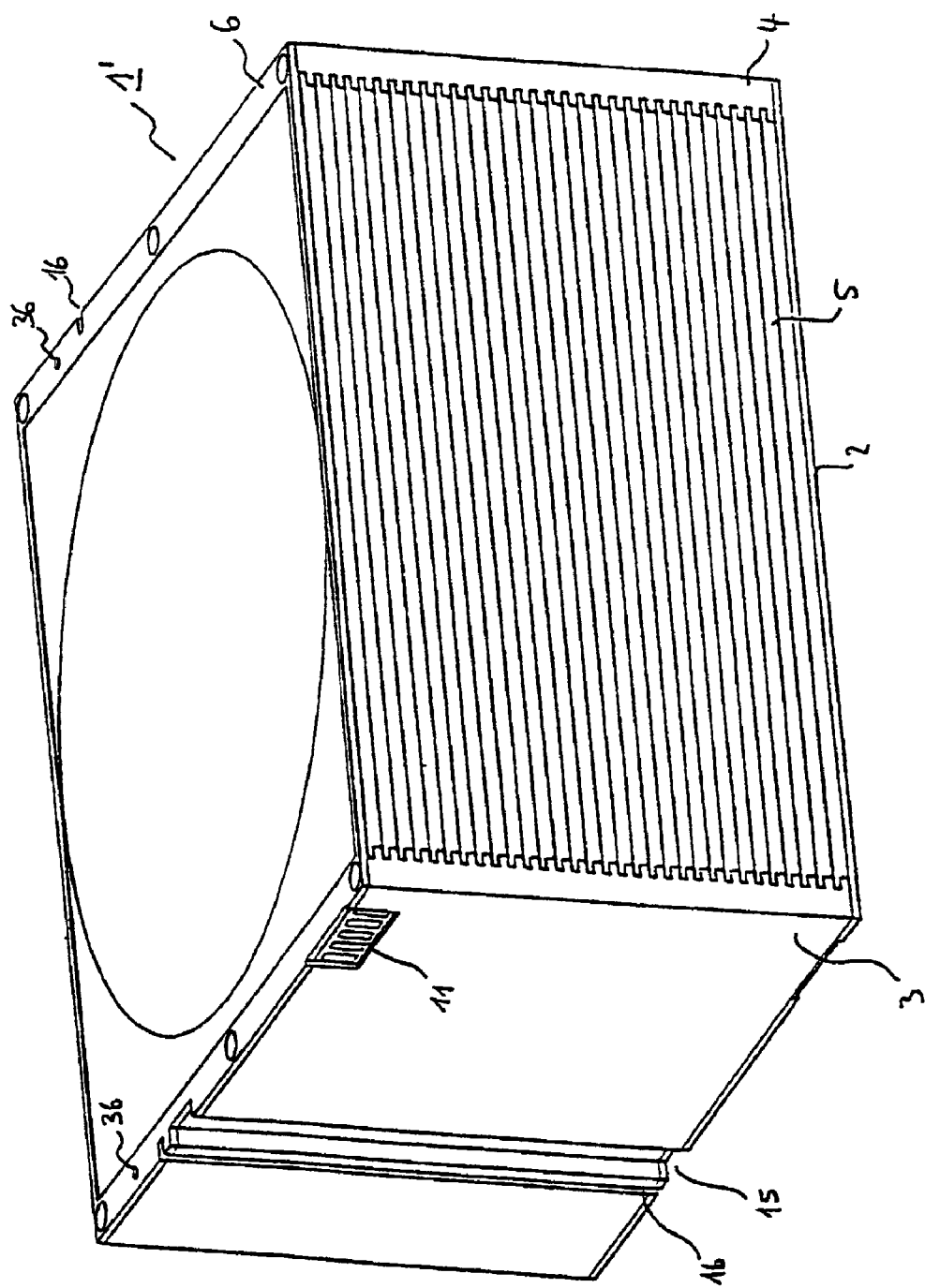
Figure 7:
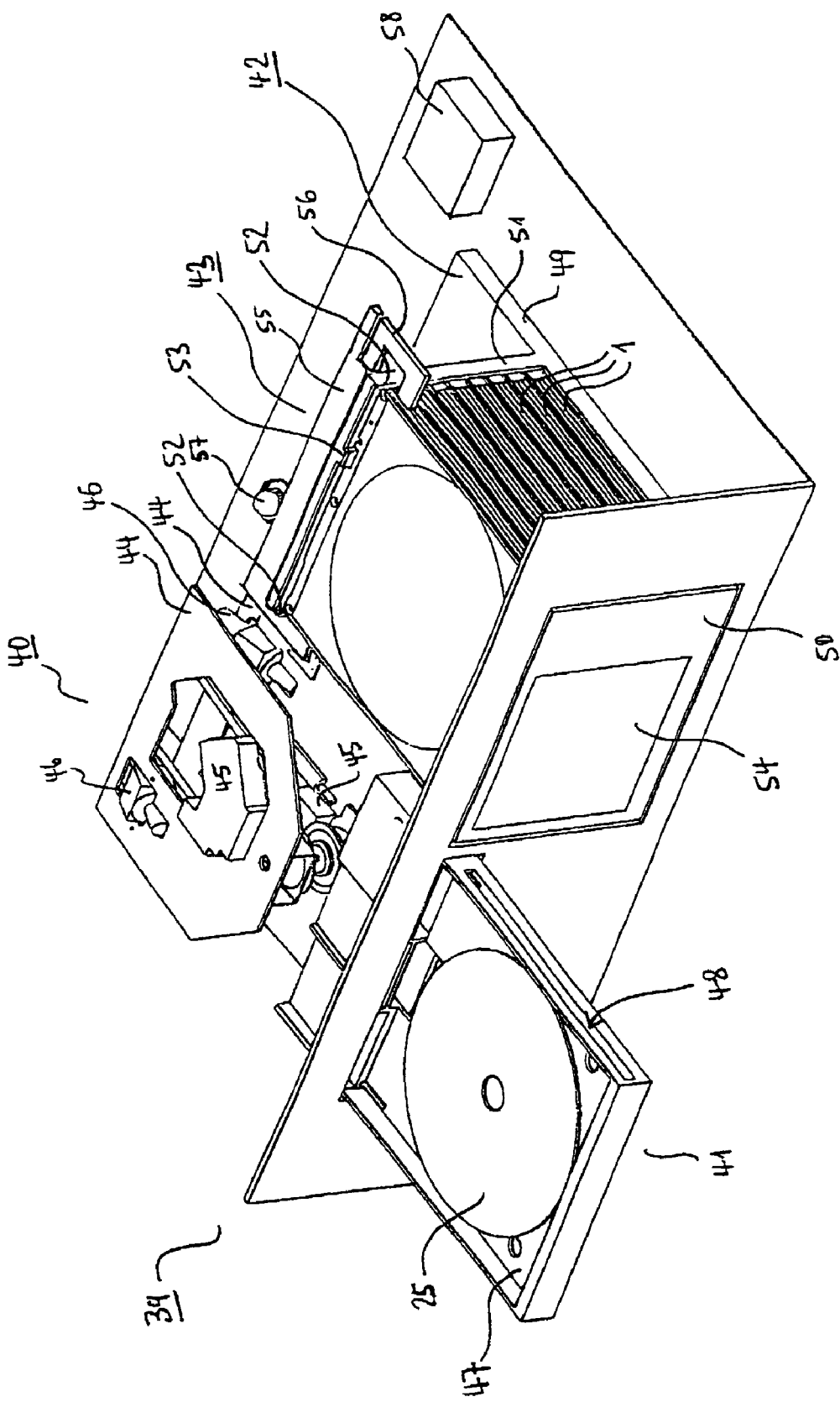
Figure 11:
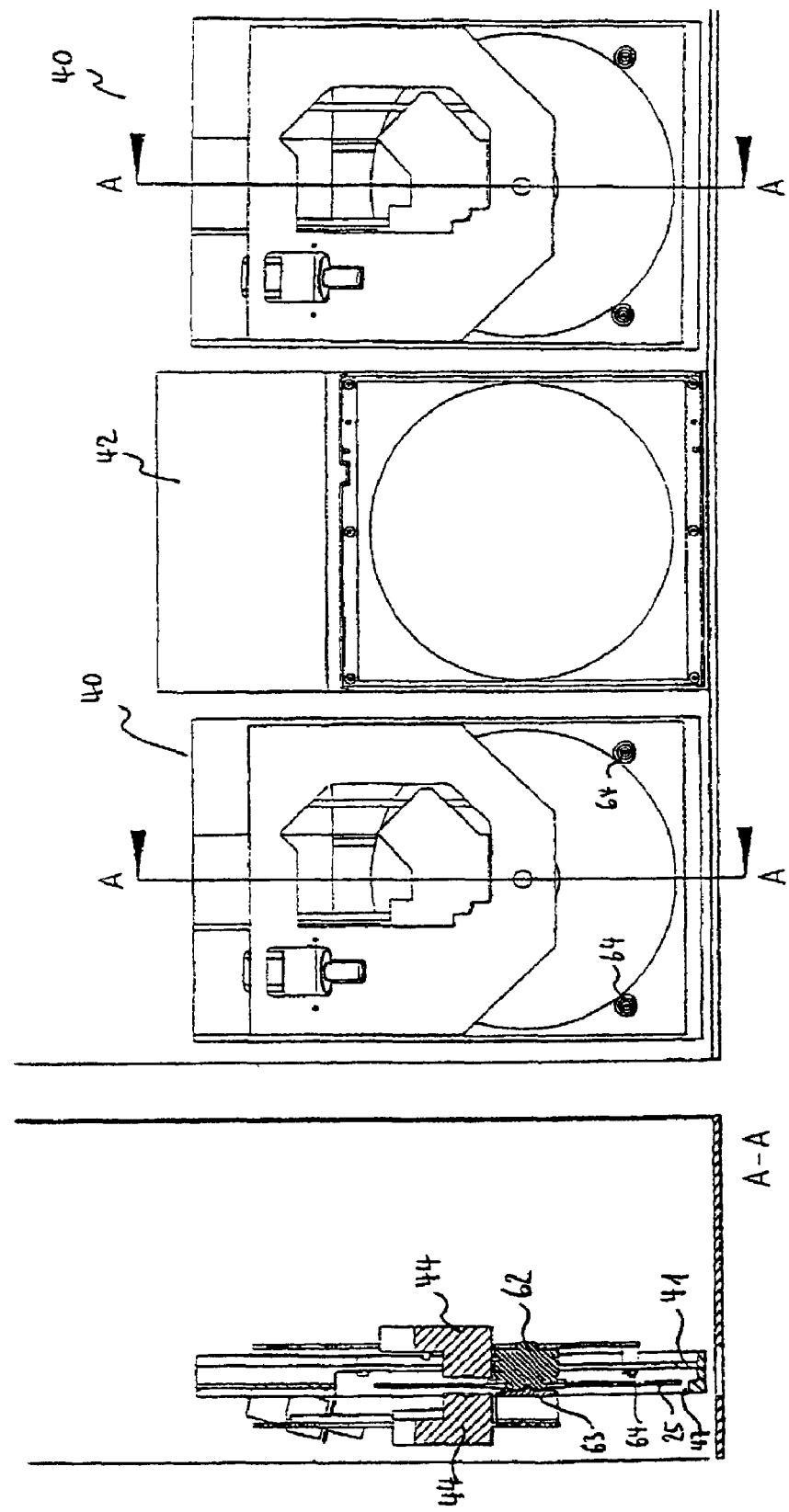
Figure 12:
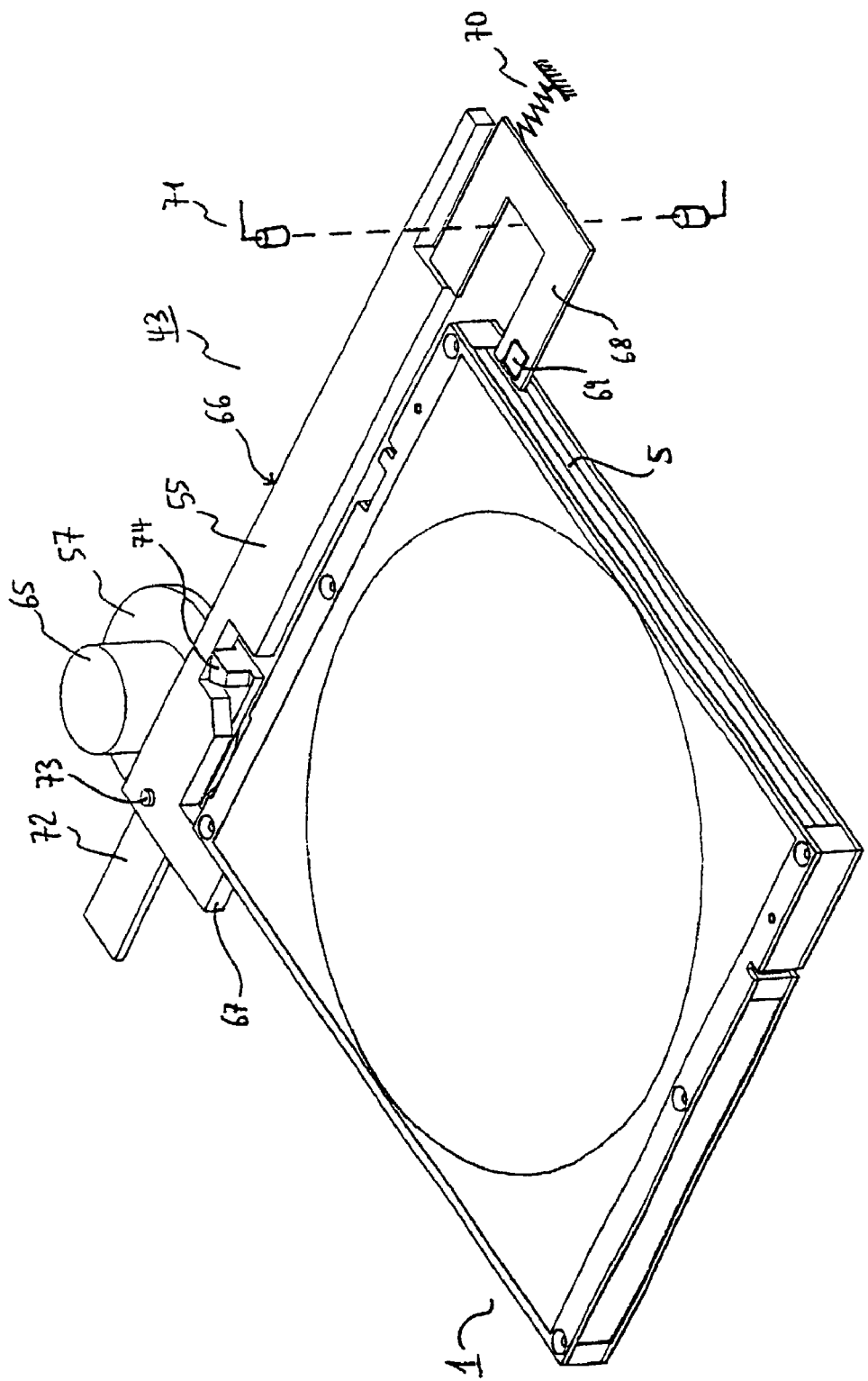
Figure 13:
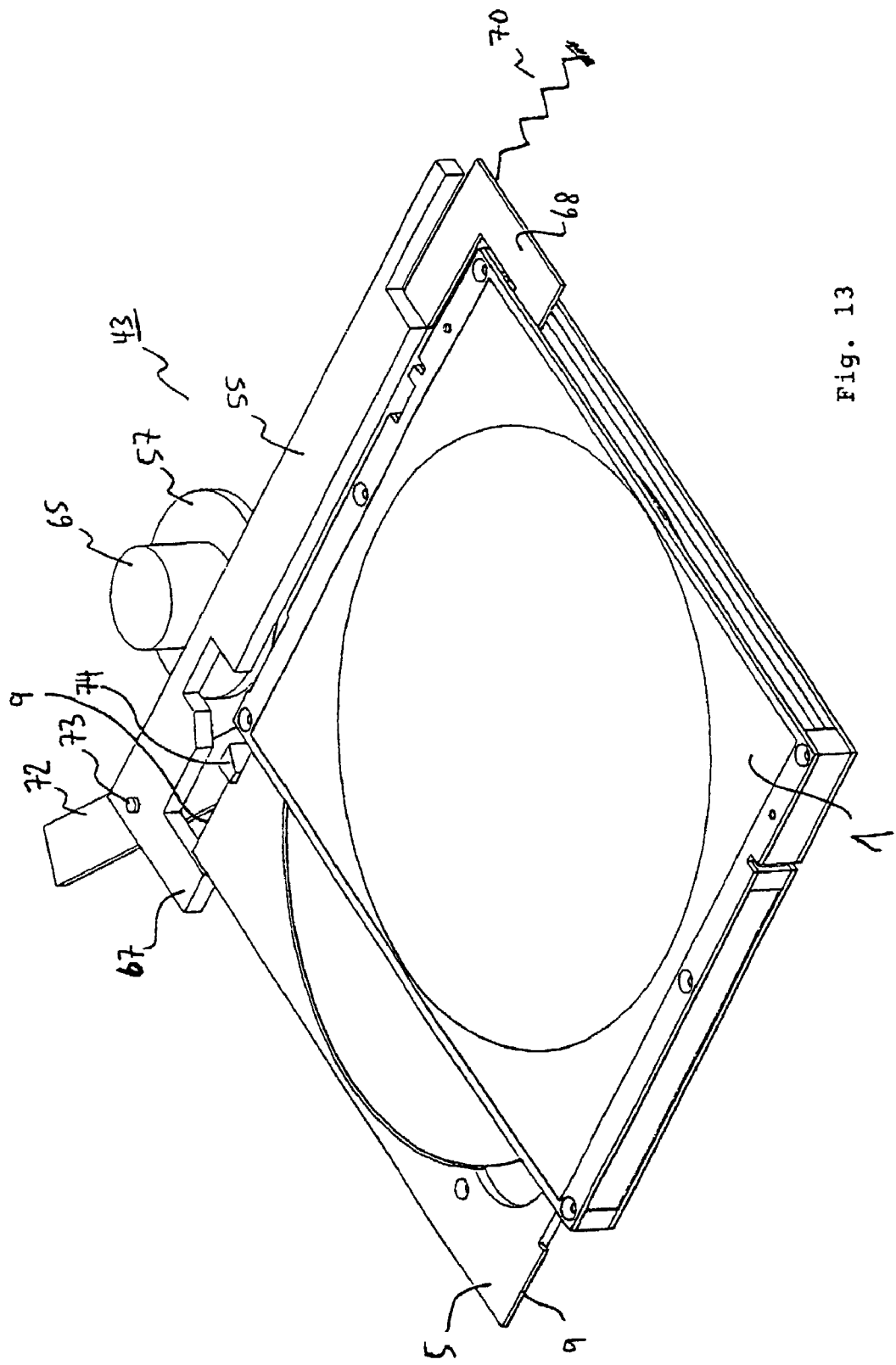
Figure 14:
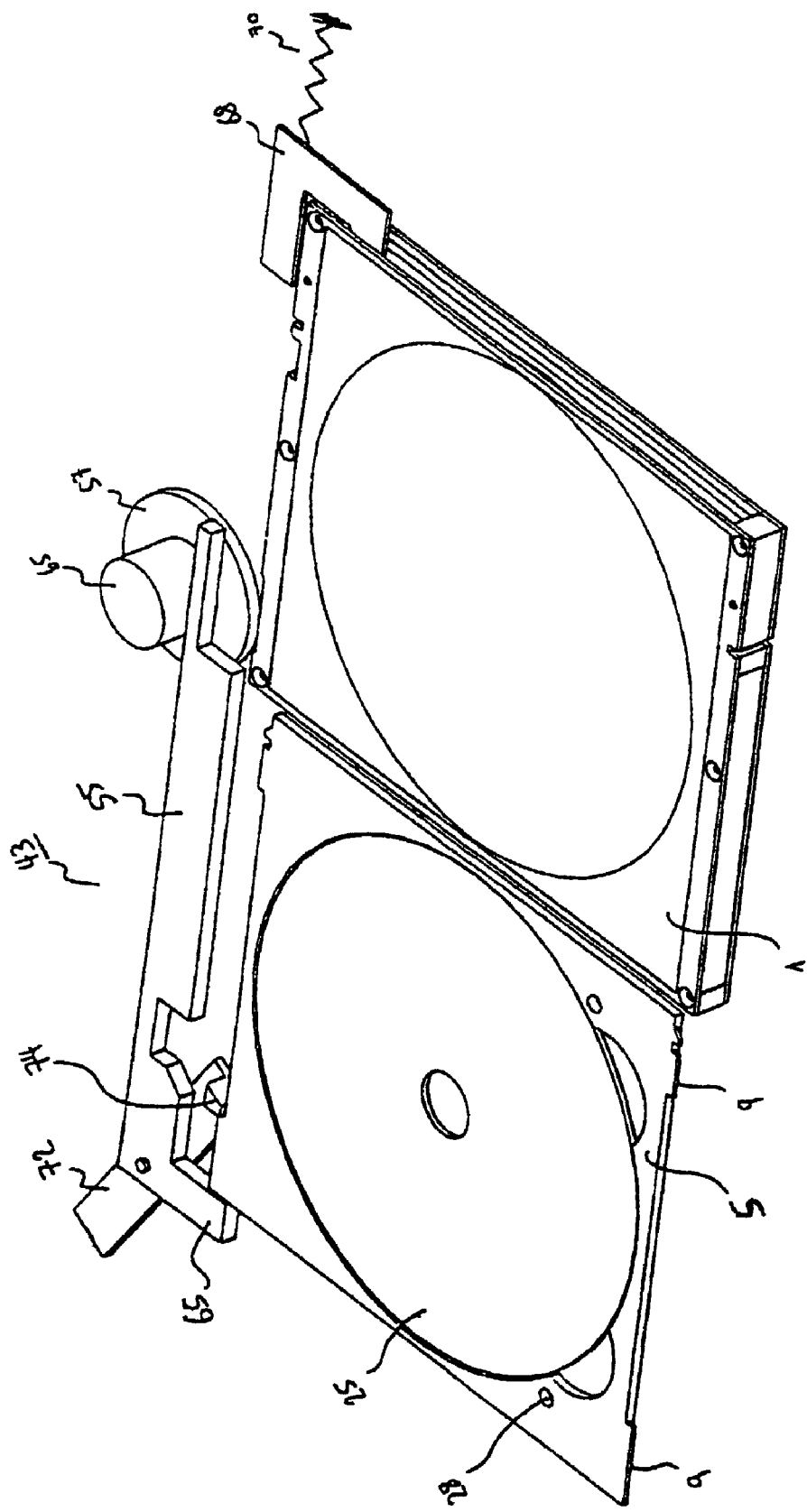
Figure 18:
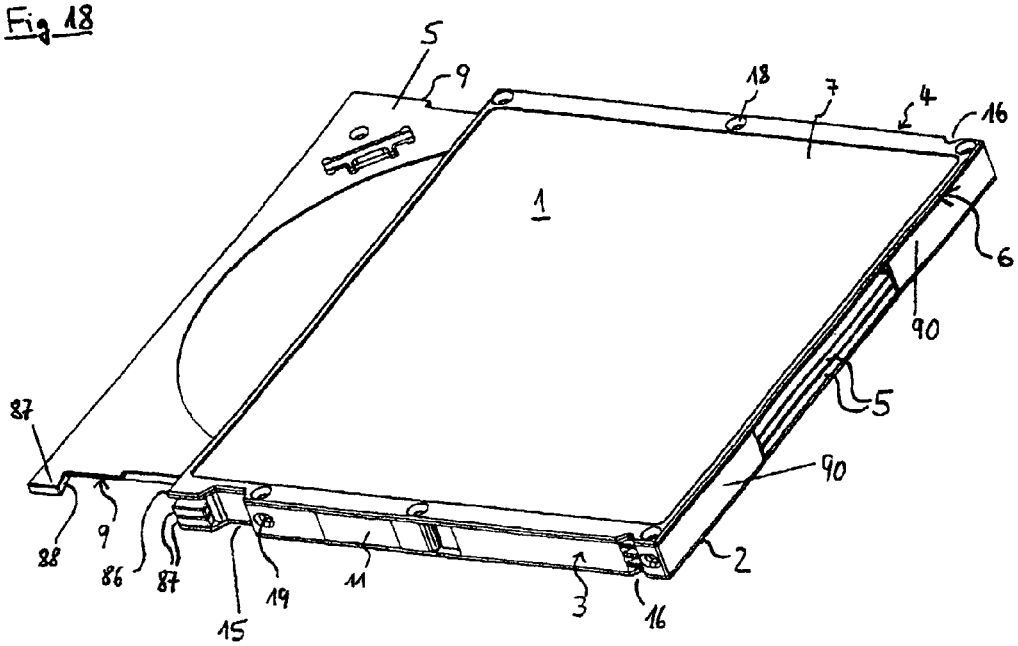
Figure 19:
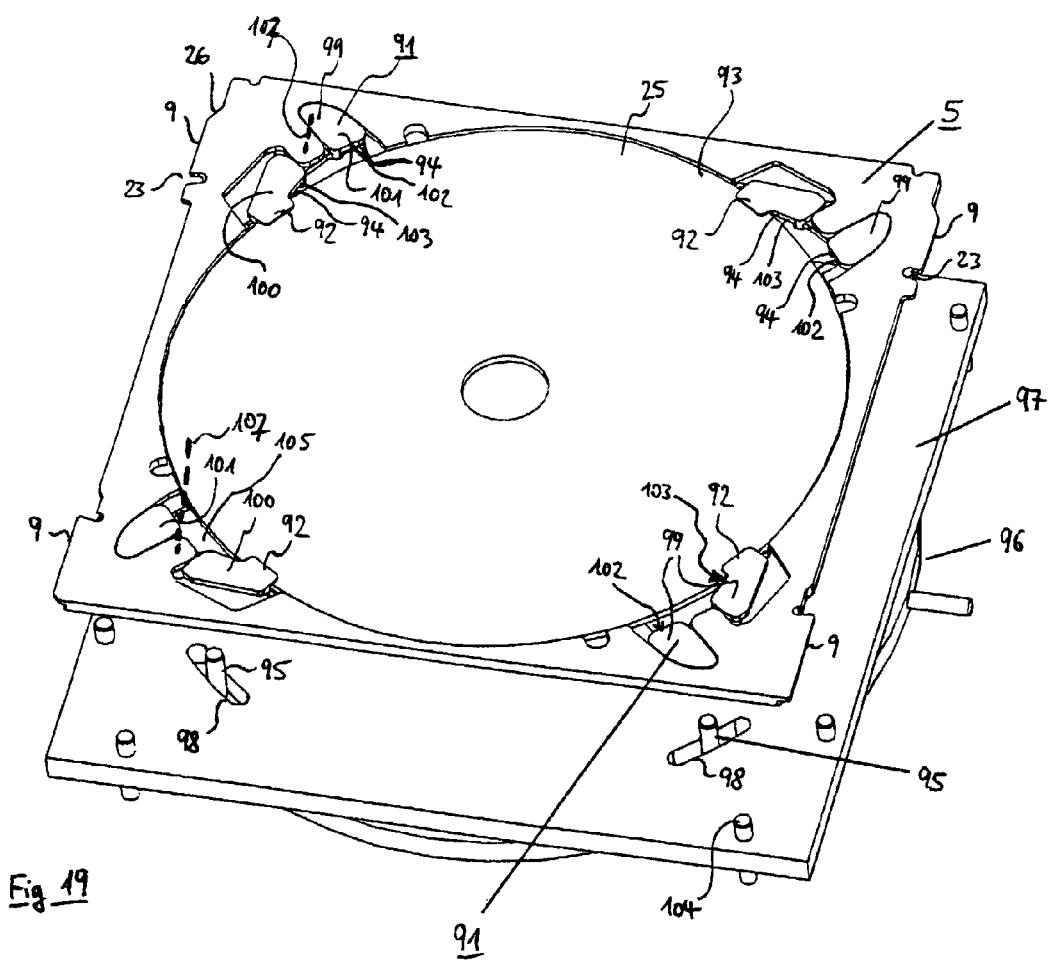
Figure 20:
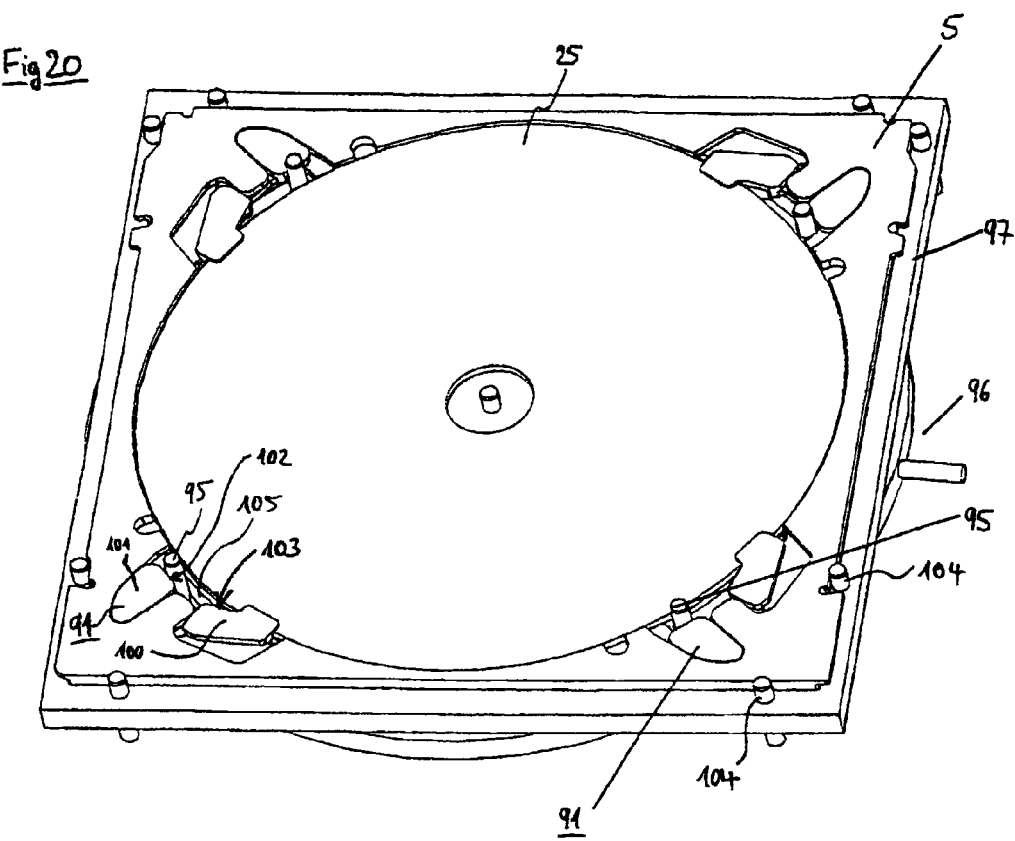
Figure 21:
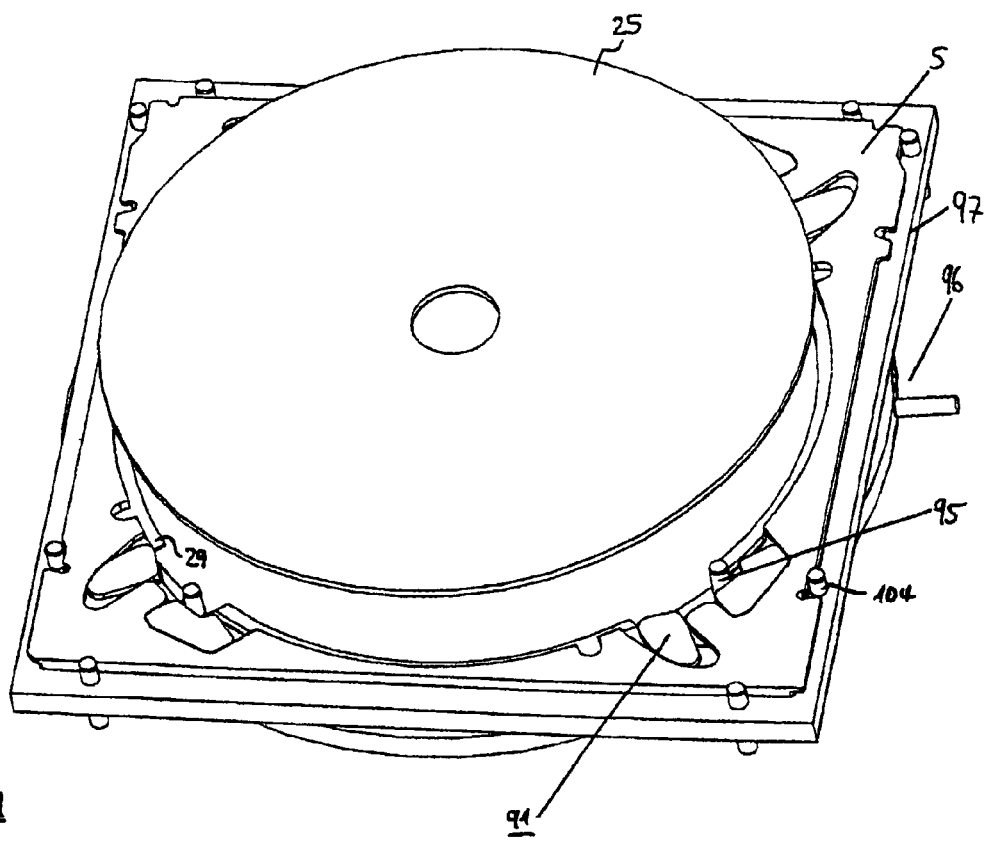
Figure 22:
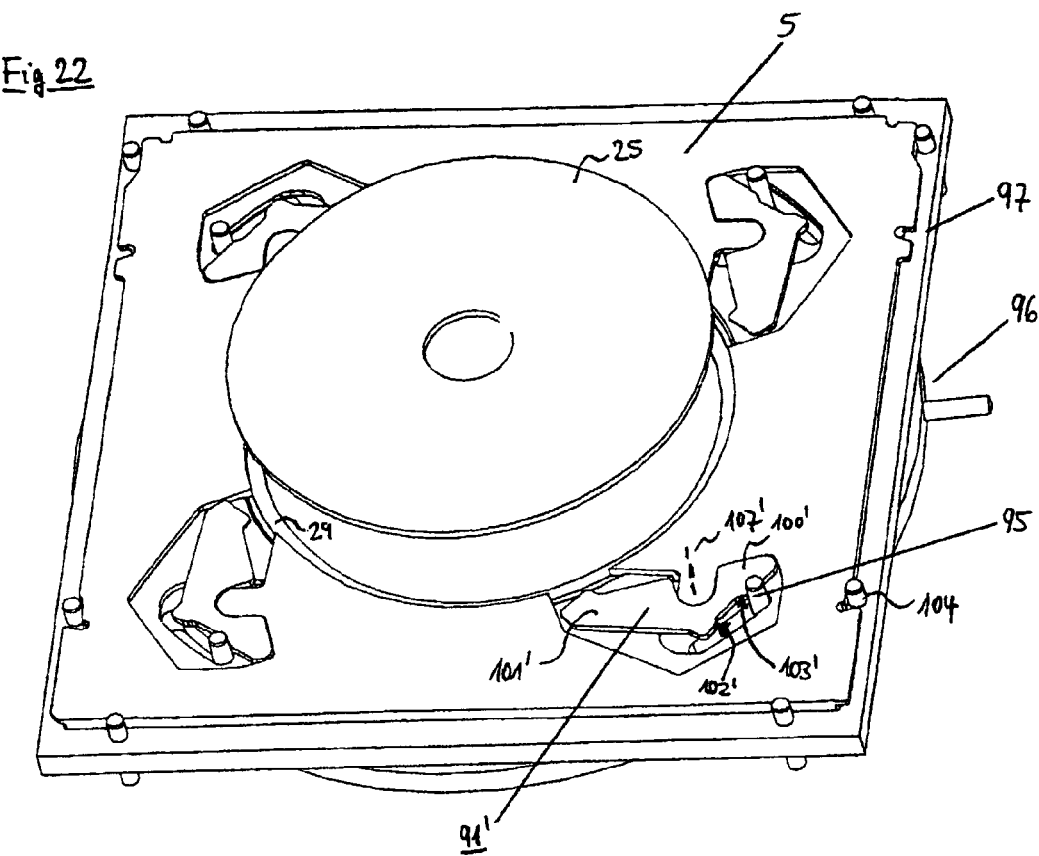
Figure 23:
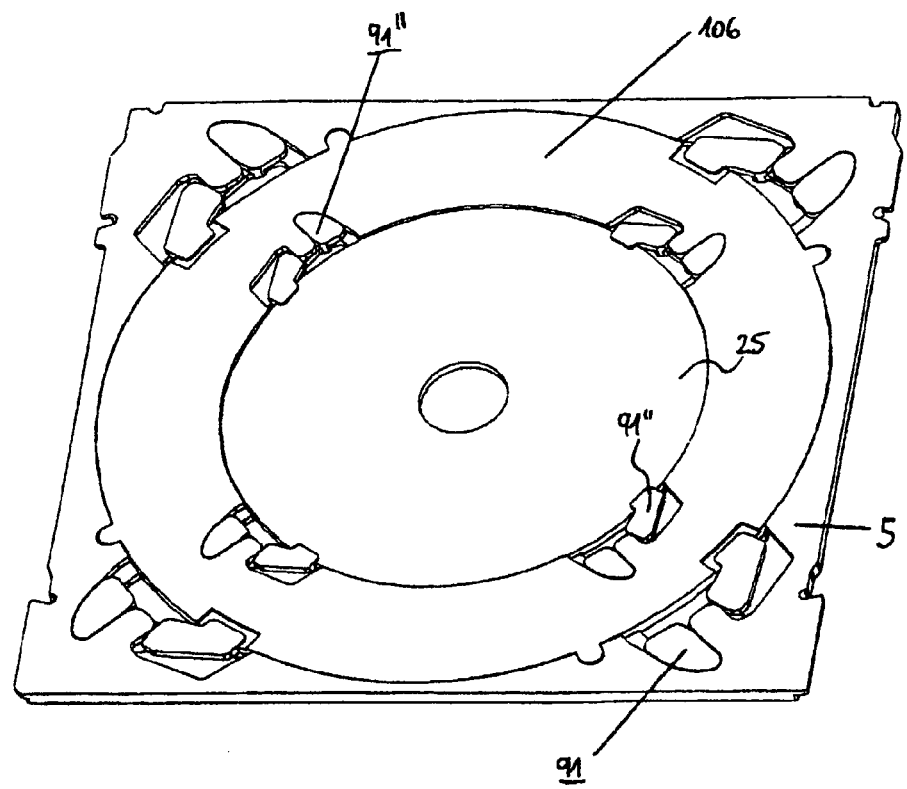
Figure 24:
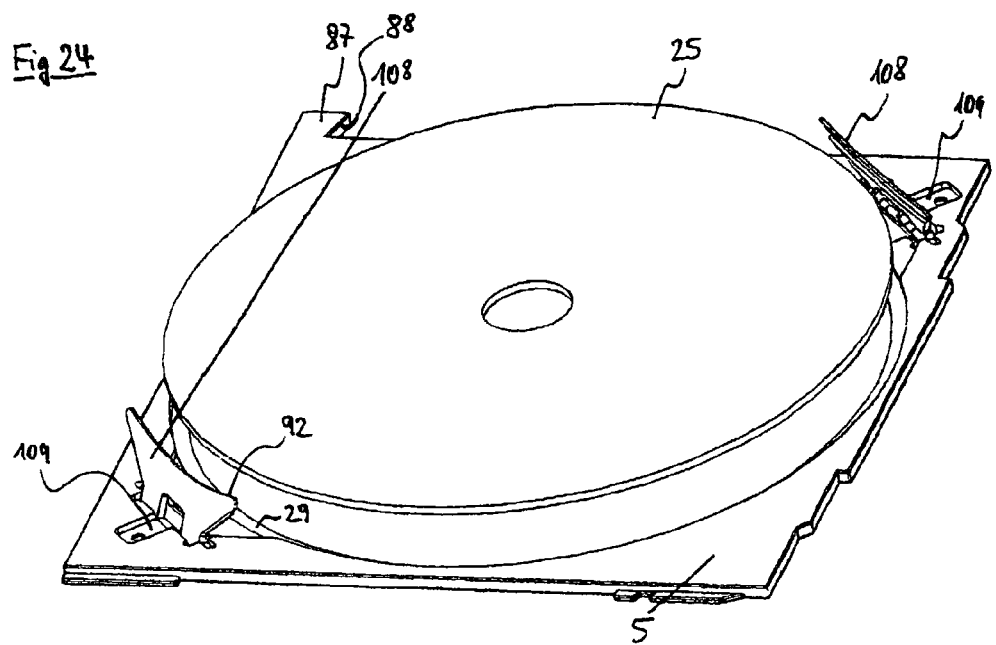
Figure 25:
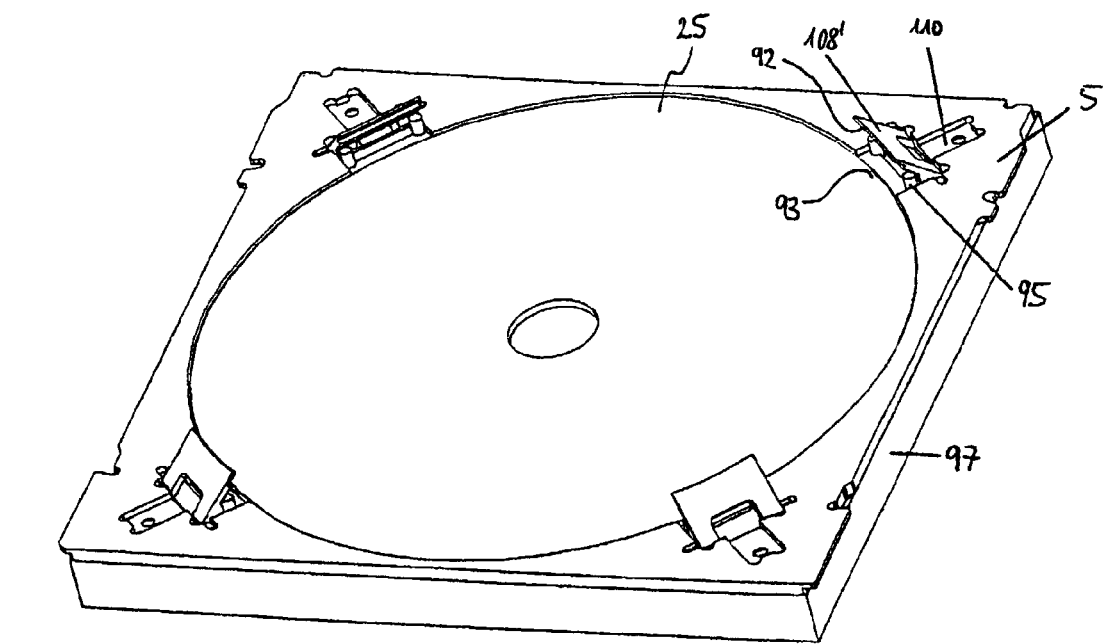

FIG. 1: perspective view of an inventive container;
FIG. 1A Cross sectional view of a part of a container;
FIG. 2: perspective view of partly opened container;
FIG. 3: adapter and tray according to the invention;
FIG. 4: bottom view of inventive container;
FIG. 5: top view of inventive container;
FIG. 6: large container according to the invention;
FIG. 7: magazine type player according to the invention;
FIG. 8: magazine type player loaded with a cartridge;
FIG. 9: magazine type player loaded with tray;
FIG. 10: magazine type player in container changing position;
FIG. 11: magazine type player having two optical pick-up units;
FIG. 12: tray accessing mechanism of a magazine player;
FIG. 13: tray accessing mechanism in tray releasing process;
FIG. 14: tray accessing mechanism in released tray position;
FIG. 15: different type of tray;
FIG. 16: different type of pushing element;
FIG. 17: magazine type player according to the invention;
FIG. 18: different type of container;
FIG. 19: tray with disk holder, unreleased;
FIG. 20: tray with disk holder in holding position;
FIG. 21: tray with disk holder, released;
FIG. 22: tray for small diameter disk;
FIG. 23: tray with adapter for small diameter disk;
FIG. 24: tray with swinging type disk holder;
FIG. 25: tray with different type swinging disk holder.

FIG. 1 shows a perspective view of a container 1 according to the invention. The container consists of a bottom plate 2, side walls 3, 4 between which trays 5 are arranged and a cover plate 6. The cover plate 6 is provided at its upper, outer surface with a rectangular depression 7 in which a circular, transparent window 8 is arranged. Preferably, the transparent window 8 consists of the same material as the rectangular depression 7, wherein just the surface of the window 8 is smooth while the surface of the depression 7 is rough, so that transparency or intransparency is reached. Through the transparent window 8 it is easy to check the content of the upper one of trays 5.

The height H of the container 1 of FIG. 1 is much smaller than its depth D and its width W, both defining a first base line D and a second base line W of a rectangle being given by the dimensions of bottom plate 2 or cover plate 6. In the embodiment of FIG. 1 the dimensions of height H equals H=10 mm, depth D equals D=125 mm and width W equals W=142 mm. These dimensions are identical with those of a usual optical disk container, also called Jewel box. However, the container 1 according to the invention is able to store up to three disks 25 instead of a single one according to the usual container. As can be seen at the front side of container 1, the height of bottom plate 2 and cover plate 6 is half the size of each of the trays 5. That means, if two identical containers 1 are stacked one upon the other the difference between two trays 5 is always an integer multiple of the height of one tray 5, as the height of neighbouring bottom plate 2 and cover plate 6 add together to the height of one tray 5. As can be seen further the front sides of the trays 5 are plane and form together with the respective front sides of bottom plate 2, cover plate 6 and side walls 3, 5 a substantially plane front surface.

The trays 5 are provided with projections 9 at the upper end and being guided in guide grooves 10 of the side walls 3, 4. At the left side of the container 1, at side wall 3 there is arranged an identification area 11 which, in the Figure, comprises several electrical contacts 12. Instead of electrical contacts, it is also possible to arrange for optically accessible markings as for example a bar code or other contactless identification means. There is further provided read-write protection means 13, consisting of three dip-switches 14 for manually setting a read or write protection for each of the trays 5. Side wall 3 is further provided with an orientation groove 15 which has no counterpart at the other side and which is arrange asymmetrically, so that correct orientation of the container 1 can be assured by use of orientation groove 15. A release groove 16, which is also present at side wall 4, can be accessed in order to release one or several of the trays 5 to be able to be slit out of the container 1. Support areas 17, at which the height H is controlled to be very close to defined values are indicated, however, not visible in the scale used. There are three support areas 17 in order not to create indefiniteness. The container 1 is further provided with connector openings 18 to which connecting means may be attached in order to connect two or more containers 1 together to a single part.

Orientation grooves 19 are arranged at the height of the middle tray 5 at the front edge of the side walls 3 and 4. These orientation grooves 19 may be used in order to assure correct orientation of container 1 relative to a replay device.

FIG. 2 shows a perspective view of a partly opened container 1. Same parts are indicated with same reference numbers throughout the application and are referred to only in case of different function or additional information. The cover plate 6 is removed in FIG. 2 (not shown) as well as the top one of trays 5 which is shown separately. Guide grooves 10 are visible now more clearly.

At the far end of side walls 3, 4 there are arranged releasable locking means 20. They consist of pivotable levers 21 having a first nose 22 to cooperate with a respective hole 23 of the tray 5 and a second nose being accessible at the release groove 16 from the outside. In the Figure, there is shown a single lever 21 in side wall 4 for releasing or locking all three trays 5 at the same time. At the other side wall 3, there are three levers 21 stacked one over another, so that by selecting one of these levers 21 a special tray to be released can be selected. Both visible trays are filled with an optical recording medium 25. The separated tray 5 shows clearly projections 9 and hole 23 to be guided in guide grooves 10. The projections 9 having holes 23 are provided with a rising edge 26 in order to move levers 21 when the tray 5 is inserted into its locked position. Gripping holes 27 are arranged within the tray 5 in order to be able to access the disk 25 by means of the fingers of a human hand. Orientation wholes 28 are provided in the tray 5 in order to assure exact positioning of the tray 5 in a playback device.

FIG. 1A shows a partly cross sectional view along line AA of FIG. 1. On the bottom plate 2 there is arranged at the right hand side a side wall 4 having guiding grooves 10. Within the guiding grooves 10 projections 9 of the trays 5 are guided. The projections 9 are arranged at the upper part of trays 5 and extend outwardly. At the lower part of the trays 5 there are arranged support areas 29 extending radially inwardly with respect to a circular depression of the tray 5. The circular depression accommodates the disk 25. As can be seen, the thickness of the support areas 29 is very small and reduces in radially inwardly direction. This ensures, that the optical recording medium 25 is supported only at its outer edge. Preferably the support areas 29 are provided with a slope at their upper surface as well as on their lower surface. This has the advantage that even in case that the container is turned upside down, the disk 25 housed in a tray 5 is supported by the neighbouring tray 5 at the sloped lower surface of its support areas 29. Similarly the inner part of cover plate 6 is provided with a sloped circular area 85 which is shown in FIG. 1A in an exaggerated manner. This sloped circular area 85 has also a disk supporting function in case of the container 1 being turned upside down.

FIG. 3 shows an adapter and a tray according to the invention. Within tray 5 there is arranged an adapter 30. Its outer surface is formed such that it exactly fits in the opening of the tray 5, including gripping holes 27. For this reason the adapter 30 is provided with radially outwardly extending noses 31. In its radially inward part there are also arranged gripping holes 32 and, at its lower end, support areas 33 which also are reduced in thickness from their radially outwardly end to their inner end. The support areas 33 do not form a complete circle. There is arranged an opening 34 for making possible access from the downside through opening 34 to the radially outwardly area of a disk 25 accommodated on the support areas 33. A similar opening is also arranged in the support area 29 of tray 5, which is not visible here. The adapter 30 is insertable and removable from tray 5 in order to be able to accommodate an optical recording medium 25 of lower diameter.

FIG. 4 shows a bottom view of a container 1 according to the invention. The bottom plate 2 is provided with a rectangular depression 35 which depression is about 0.1 mm deep. The depression 35 is preferably used to stick a label on it. Because of the depth of the depression and the thickness of the label, which latter is smaller than the former, no additional thickness to the container 1 is added. At side wall 4 there is provided a depression 36 which is also suited for sticking a label on it. Here, too, the thickness of the label is smaller than the depth of the depression 36 so that the size of the container 1 is not increased even if a label is sticked on it. The advantage of a label sticked at depression 36 is, that it is visible, even if several containers 1 are stacked together. In this case only the depression 34 of the lowest container 1 in the stack would be visible, whereas all depressions 36 of the stacked containers 1 are visible, and thus all labels arranged there. In order to increase the size of depression 36 release groove 16 might be moved nearer to the end of side wall 4. The dimensions of the outer surfaces of trays 5 and the parts surrounding trays 5 are such that there is only very small open space between trays 5 and surrounding parts. This ensures that it is very unlikely that dust or other particles that might have a disturbing effect may enter into the container 1.

FIG. 5 shows a top view of the container of FIG. 4. Difference to the container 1 of FIG. 4 is, that it contains only two trays 5 and that instead of the uppermost tray 5 there is provided an opening 80 for storing additional items. E.g. a booklet, containing information with regard to the optical disks 25 stored within the trays 5, may easily be housed between cover plate 6 and an additional, closed layer 81, and being accessible via opening 80. Preferably the opening 80 is arranged at the position of the lowermost tray 5, which is not shown here. This has the advantage that the stored item, e.g. the booklet, may be visible through the bottom plate 2. In any case, the stored item does, in this arrangement, not prevent visibility through window 8 onto the disk 25 stored.

FIG. 6 shows a large container according to the invention. The construction of this container 1' is similar to that of FIG. 1. On a bottom plate 2 there are arranged side walls 3, 4 the height H of which is much larger than for those of FIG. 1. Accordingly a higher number of trays 5 is stacked between side walls 3, 4. In the example there are stacked 31 trays. The cover plate 6 is similar to the one already described. Orientation groove 15 and release groove 16 extend over the entire height of the side walls, while identification area 11 keeps similar size as for the container 1 of FIG. 1. Holes 36 are used to fix the axes of rotation of levers 21 with which locking and releasing of trays 5 is made possible.

FIG. 7 shows a magazine type player and/or recorder according to the invention. The magazine type player 39 comprises an optical pick-up unit 40, a drawer 41, a magazine tray 42 and a tray moving mechanics 43.

The optical pick-up unit 40 consists of two mechadecks 44, each of which being equipped with an optical pick-up 45, respective electric motors 46 and other parts usually available on a mechadeck 44 of an optical read/write device, known to the skilled person. The drawer 41 is shown in an outward position in which it is possible to manually insert or remove an optical recording medium 25. The recording medium 25 is shown in the disk receiving portion of the drawer 41 which is also the tray receiving portion 47. For being loaded with a tray 5 and for removing the tray 5 from the tray receiving portion 47 the drawer 41 is provided with a guiding slot 48. Through guiding slot 48 a tray 5 may be inserted to or removed from the drawer 41.

The magazine tray 42 has a base plate 49 on which a front wall 50 and a rear wall 51 are arranged. Between the front wall 50 and the rear wall 51 several containers 1 are stacked one over the other. Walls 50, 51 are provided with guiding ribs 52 in order to guide the containers 1 within the stack. The rear wall 51 further is provided with an orientation rib 53 for making it impossible to insert a container 1 in wrong direction, for example in upside down direction. The front wall 50 is provided with a transparent window 54 for enabling a user to directly look at the stacked containers 1, especially at a label attached to depression 36 of a container 1.

The tray moving mechanics 43 are provided with a slider 45, a pushing element 56 and a motor 57. Further elements and working effect of the tray moving mechanics 43 will be described later on. A control unit 58 for controlling working of the different parts of the device and for storing and keeping information about stacked containers 1 and disks contained in the containers 1 as well as means for creating unique codes to be assigned to different containers 1 is also present.

FIG. 8 shows the left part of a magazine type player according to FIG. 7. In this figure the drawer 41 is loaded with a cartridge 59 in which an optical recording medium 25 is housed. The cartridge 59 is for example a cartridge according to the DVD-RAM standard.

FIG. 9 shows the left part of a magazine type player 39 similar to the one of FIG. 8 wherein, in this case, the drawer 41 is loaded with a tray 5 according to the invention. The tray 5 was inserted into drawer 41 via the guiding slot 48. It is guided within the drawer 41 in guiding grooves (not shown) so that it cannot be removed manually from the drawer 41. It is just possible to remove and insert the disk carried on the tray 5. In this figure the radially inwardly extending support areas 29 are visible. At the bottom of the drawer 41 there is an access hole 60 for enabling access to the optical recording medium 25 from the downside. This access is for example a mechanical access in order to fix the disk position and to rotate the disk 25. It is also an optical access for guiding a light beam through access hole 60 to the disk 25 in order to scan the data stored on the disk or to write new data onto the disk. As can be seen there is no support area 29 in the area of the access hole 60 thus enabling access to the disk 25 even in its most outer region. The orientation holes 28 of tray 5 are placed at the same position as orientation holes 61 of cartridge 59 of FIG. 8, so that the exact position of tray 5 and thus the disk 25 held by the tray 5 is fixed by the same means that also fix the correct position of cartridge 59.

FIG. 10 shows the right part of the magazine type player of FIG. 7 in a container changing position. A magazine tray 42 is shown in its outer position in which the user may access to the containers 1. In this position one or several containers 1 may be removed and new containers 1 may be added. In the figure there are only shown containers 1 containing three disks each. However, it is also possible to stack larger containers into the magazine tray, e.g. 7-tray-containers, 15-tray-containers, 31-tray-containers etc. The stack of containers 1 constitutes thus a disk magazine being more compact than already known disk magazines of similar storage capacity.

FIG. 11 shows a magazine type player having two optical pick-up units 40. On the right hand side there is shown a top view of the player 39 having two optical pick-up units 40 being arranged at the left and the right side of the magazine tray 42. For ease of visibility the tray moving mechanics are not shown in this picture. On the left hand side there is shown a cross sectional view along line AA. The two mechadecks 44 are visible. The lower one, which is shown on the right side, comprises a disk motor 62 whereas the other comprises clamping means 63 instead of a disk motor 62. Disk motor 62 and clamping means 63 provide for fixing and rotating the disk 25. Orientation pins 64 provide for exact positioning of mechadeck 44 relative to drawer 41 and, if available, cartridge 59 or tray 5 being arranged within the tray receiving portion 47 at the drawer 41.

FIG. 12 shows a container 1 and a tray accessing mechanism of a magazine type player. A motor 57 drives a toothed wheel 65, which engages a toothed rack 66 of the slider 55. At the left side, the slider 55 is provided with a push nose 67 for pushing a tray 5 into its rest position within the container 1. At the other end of slider 55 it is in contact with a pushing element 68. Pushing element 68 is of U-shaped form, wherein one leg is in contact with slider 55 while the other leg is positioned in short distance from a tray 5. At this leg there is provided a pressure sensor 69 for sensing if the pushing element 68 is in contact with a tray, bottom plate 2, cover plate 6 or anything else. The pushing element 68 is further pre-stressed by a pushing means 70 which is diagrammatically shown to be a spring. A movement sensor 71 is diagrammatically shown as a light barrier. In case that pushing element 68 is moved, the light path is blocked and movement sensor 71 indicates that pushing element 68 is moved out of its rest position. At the left side of slider 55 there is provided a pull lever 72, which is rotatable about an axis 73. At its right end the pull lever 72 is provided with a pulling nose 74 at its lower side, which is not visible here. Pull lever 72 co-acts with a cam 75, when the slider 55 is moved, in order to change the rotational position of pull lever 72.

FIG. 13 shows the tray accessing mechanism of FIG. 12 during a tray releasing process. In can be seen, that, driven by motor 57 and tooth wheel 65, the slider 55 has moved to the left side. This has caused the pushing element 68 to be pushed by pushing means 70 with its one leg into the container 1. After having come into contact with a tray 5, the pushing element 68 has pushed this tray 5 partly out of the container 1. During this movement tray 5 is still near to or in contact with push nose 67. The leftward movement of slider 55 has caused the pull lever 72 to be pivoted about its axis 73 caused by its interaction with cam 75 (not visible). At the end of this movement pulling nose 74 is in contact with projection 9 of tray 5. The further outward movement of tray 5 is now caused by the movement of pulling nose 74 pulling projection 9 and thereby tray 5 out of the container 1.

FIG. 14 shows a tray accessing mechanism in a released tray position in which tray 5 is completely removed from container 1. Pushing element 68 rests in its position where it is in contact with container 1 while slider 55 has reached its end position. The mechadecks 44 which have been pivoted out of their working position in order to make possible accession of tray 5 and disk 25 into the playback position are now moved towards disk 25. By this, orientation pins 64 are brought in a position to cooperate with orientation holes 28 in order to assure the exact position of the optical recording medium 25 and disk motor and clamping means 63 come in contact with disk 25. After disk 25 has been accessed and tray 5 shall be brought back to container 1, the mechadecks 44 are again removed from disk 25 and the inward movement may start. Therefore, slider 55 is moved by the toothed wheel 65 in rightward direction. Push nose 67 pushes tray 55, which is guided within guide rails of the magazine tray 42, through guiding slot 48 in direction of the container 1. The cross sectional shape of guiding slot 48 is thus that it exactly positions tray 5 vertically in order to exactly enter the opening of container 1. Tray 5 is pushed further into container 1 until it reaches its end position in which locking means 20 fix its position. Before reaching the end position corresponding to FIG. 12, pull lever 72 is rotated again into its rest position wherein pulling nose 74 is out of contact with the tray, pushing element 68 is then also pushed back to its rest position.

In case that a tray is missing in the container 1 and access should be made to the respective position, the pressure sensor 69 will not sense contact. However, the movement sensor 71 will sense movement of pushing element 68. In this case, the control unit 58 stops the outward movement of slider 55 and makes it move back to its rest position. In case that no tray is available, it is not necessary to move the slider 55 further on.

For accessing a certain tray 5, tray moving mechanics 43 as well as the optical pick-up unit 40, which both are interconnected to be moved synchronously, are moved upwards or downwards in order to reach the specific trays' position. Usually the trays are in predetermined distances from each other, so that stepwise movement of tray moving mechanics should allow for correct positioning with respect to a tray 5. However, orientation grooves 19 make possible to assure the correct position relative to the tray 5 in order to correctly reposition tray moving mechanics 43.

Advantages of the idea of the invention are, that the container 1 is integral part of the magazine tray 42 and that the optical disk 25 can be automatically moved from the container 1 into its playback position in the device 39. A further advantage is, that no additional waste is produced, as packaging in the store is the same as packaging in the magazine type device 39. Apart from container 1, no additional packaging is necessary. This container 1 has advantageously small size, comparable to known Jewel boxes, but relatively large storage capacity.

FIG. 15 shows a tray 76 for storing additional items. The sides co-acting with side walls 3, 4 of container 1 are identical to those of the disk carrying trays 5 described before. Difference is, that tray 76 has a nearly completely closed bottom plate 77 above which is provided a rectangular space for storing additional items, preferably a booklet relating to one or several of the disks stored in the other trays 5 of a container 1. This open space is surrounded by side walls 78 wherein the thickness of the bottom plate 77 is about ¼ to ½ of the height of the side walls 78. A hole 79 is provided for accommodating pushing element 68. In case that tray 76 is accessed by the tray moving mechanics 43, it should not be moved out of the container as it does not contain a disk 25. Pushing element 68 does not come into contact with tray 76 as it enters the hole 79. In this case, pressure sensor 69 does not indicate contact while movement sensor 71 indicates movement of pushing element 68. In this case, control unit 58 indicates, that there is no tray which is to be moved into a replay position. Therefore, the tray moving mechanics 43 is stopped and moved back into its rest position.

FIG. 16 shows a different type of pushing element 82 in top view. This pushing element 82 is provided with a first leg 83 for coacting with said slider 55 and with a second leg 84,84' for coacting with said tray 5. The second leg 84,84' is arranged such distant from the first leg 83 so that it is able to contact said tray 5 substantially in the middle area of said tray 5. The tray 5 is thus pushed at its middle area which reduces the probability of tilt of tray 5 when being pushed out. A further advantage lies in the fact that the second leg 84,84', when being inserted into the container 1 for pushing out tray 5, acts as a fixing means for a disk 25 being stored in the tray 5 which is arranged below the actually moved out tray 5. Even in case of vibrations of the player 39 or other mechanical disturbances the disk 25 is securely held in its rest position on the respective tray 5. Preferably the second leg 84 has a rounded shape as shown in the figure. It then enters into the opening in which the tray 5 is housed with the full width of the tray 5 so that no opening is left uncovered. According to a different embodiment which is shown by dotted lines in the figure, leg 84' is of small width, similar to the leg of pushing element 68 described above.

FIG. 17 shows another type of magazine type player according to the invention in a perspective view omitting to show many parts not necessary to be described to a skilled person in detail. A container 1 as described in more detail with regard to FIG. 18 is used. Middle and lower tray 5 are within the container 1 while the upper tray 5 is removed from the container 1 into the tray receiving portion 47 of the player. A slider 55 slideable on a rail 111 is provided with a push-pull element 89 having a pushing nose 112 as pushing element 56 for pushing tray 5 back into the container 1, and a pulling nose 113 for pulling tray 5 out of container 1. Both coact with hook 87 of tray 5. Disk 25 is in this view already released from the tray 5 and attached to optical pickup unit 40. As can be seen, the disk is below the tray 5, tray 5 thus opens and releases the disk in downward direction. Disk release pins 95 approach tray 5 from its upper side, coact with swinging type disk holders 108 for urging them to swing downwards. Disk release pins 95 also coact by means of an outwardly extending projection, not visible here, with holding projection 92 of disk holder 108. Thus disk release pin 95 in this case also acts as tray holder in order to move tray 5 away from disk 25 in order to allow for playback. The downward position of disk holders 108 is shown here. Different types of release pins and disk holders will be described with regard to the following figures. Although these following figures show an opening of the disk holders 91,108 in a way that allows that allows to remove disk 25 to the top side, they are of course also usable in devices needing downside opening. Even use in sideways opening devices is possible due to the disk fixation by disk holders 91,108. An orientation rib 53 reaches into orientation groove 15 of container 1. Thus correct orientation of the container 1 within the device is assured. Orientation rib 53 has further a vertically extending recess 114 through which pulling nose 113 moves in vertical direction if slider 55 is in its position moved into the container 1. Thus access to any other tray 5 in the container 1 or any other container stacked within the magazine is provided. Tray 5 is provided with a stepped projection 115 that partially is in contact with back walls 90 of container 1, shown in FIG. 18, and partially fits within space between back walls 90 when tray 5 is completely inserted into container 1. Stepped projection 115 has thus stopper function, dust protection function, tray insertion indication and tray removal actuation enabling function.

FIG. 18 shows, in a perspective view, a different type of container according to the invention. Most parts are similar to those as described above especially with regard to FIG. 1 and therefore not described in detail here. Orientation groove 15 is arranged near the front edge 86 of the container. The side wall 3 does not extend up to this front edge 86 so that there is a space between bottom plate 2 and cover plate 6. Into this space hooks 87 of trays 5 extend. The hooks 87 have a slightly inclined face 88 in order to reliably coact with a pulling nose 113 of a push-pull element 89 for removing the tray 5 from container 1. Container 1 of this embodiment is provided with orientation grooves 19 at side walls 3,4 in order to provide for correct positioning of container 1 within a magazine or another storing device. Orientation grooves 19 as well as connector openings 18 may also be used to seize or grab container 1 in order to move it e.g. into a magazine type player or within such device. Also other openings or recesses of container 1 as e.g. orientation groove 15 may be used therefor. Container 1 is further provided with back walls 90 at least partly closing the back side of container 1 which is the visible side in the drawing. Thus the container is open for removal and insertion of trays 5 only at its front side while the opposite side, the back side, is partially closed. Back walls 90 assure higher stability of the container 1. It is to be understood that many of the features described here but not shown in other embodiments described elsewhere in this application may advantageously be incorporated there and vice versa.

FIG. 19 shows a perspective view of a tray 5 with rotating type disk holders 91 in holding position, i.e. the disk 25 is held unreleased. Holding projections 92 of disk holders 91 extend radially inwardly over the upper part of the outer rim 93 of disk 25 and thus being a disk holding area. Lower part of outer rim 93 of disk 25 is supported by a support area 29 of the tray 5 which is not visible in this view. Disk holder 91 has a side actuating face 94 being a first actuating face. This side actuating face 94 is provided to coact with a disk release pin 95 being a first actuating means. Disk release pin 95 is part of a disk release ring 96 of a magazine type player. In the shown embodiment disk release ring 96 is arranged below a tray holder 97 through holes 98 of which disk release pins 95 extend. Pins 95 are in a middle position of holes 98 in order to fit when brought in contact with tray 5 independent of holders 91 being in holding or releasing position. Holders 91 are designed such that opening 105 is always free to receive pins 95 if these are in their middle position of hole 98. In the shown view, tray 5 and tray holder 97 are not yet in contact. This positional relation corresponds to a situation where the tray 5 is already removed from the container to tray receiving portion 47 but not yet brought in contact with the tray holder 97. Disk holder 91 further has a top actuating face 99 being a second actuating face. Top actuating face 99 is manually actuatable e.g. by the fingers of a user in order to release a disk 25 from the tray 5 or to fix a disk 25 at the tray 5. Disk holder 91 comprises two arms 100,101 being rigidly connected to one another, or being a single part, and being pivotable with respect to an axis 107 diagramatically indicated in the figure. Actuation of top actuating face 99 allows disk holder 91 to rotate about a certain angle. In the end positions of the rotational movement of disk holder 91 the dimensions of the surrounding parts of the tray 5 are designed such that friction prevents undesired movement of the disk holder 91. Position fixing means is in this case frictional force. Alternatively, not visible in this view, snap connections or other suitable connections may be provided. For actuation by means of disk release pins 95 arm 100 is provided with actuation edge 103 and arm 101 is provided with actuation edge 102.

FIG. 20 shows a perspective view of tray 5 of FIG. 19 with disk holders 91 in holding position. Tray 5 and tray holder 97 are in contact, pins 104 provide for correct orientation and for fixation of tray 5 to tray holder 97. Disk release pins 95 extend trough openings 105 between tray 5 and disk 25. Disk release pins 95 are in contact with arms 101 and thus with first actuation edge 102. Release of disk 25 may start by starting rotational movement of disk disk release ring 96. Disk release pins 95 thus start to move in counterclockwise direction, come into contact with actuation edges 103 and thus start rotational movement of disk holder 91 until end position as shown in FIG. 21 is reached.

FIG. 21 shows tray 5 of FIG. 20 with disk holder 91 in disk release position. Tray holder 97 has moved tray 5 away from the playing position of disk 25, for reason of simplicity disk 25 is shown in this position without showing clamping means, pickup means etc. In this remote position, support area 29 of tray 5 is visible. Rotatable type disk holders 91 open in radial direction of the disk 25.

FIG. 22 shows a tray 5 for a small diameter disk 25 in similar state as shown in FIG. 21. Rotating type disk holder 91' is arranged rotatably around axis 107'. It has a short first arm 100' and a longer second arm 101'. Pin 95 is in contact with actuation edge 103' while actuation edge 102' will be actuated in order to move holder 91' in its holding position.

FIG. 23 shows a tray 5 with adapter 106 for a small diameter disk 25. Adapter 106 is held and released as a normal diameter disk 25 at tray 5. Adapter 106 itself is provided with disk holders 91" which are designed similarly as described above for tray 5. They are actuated by disk release pins similar to pins 95 which are arranged radially inwardly, not visible here.

FIG. 24 shows a tray 5 with swinging type disk holders 108 in a disk release position. Two swinging type disk holders 108 are sufficient to hold the disk 25 as their holding projections 92 extend over a relatively large angle. Disk holders 108 are held in their respective position by snap fitting. Alternatively, spring operation is provided to urge disk holders 108 in hold position. Springs may therefore be provided in spring recesses 109 as position fixing means. An open position as shown is then possible if disk holders 108 are held open actively.

FIG. 25 shows a tray 5 with a slightly different type of swinging disk holder 108', also opening in axial direction of the disk 25. Four disk holders 108' are provided, being urged into their holding position by means of spring plates 110 and held in their open position by means of disk release pins 95 being arranged on tray holder 97. These pins 95 are fixed to tray holder 97, no separate movement is necessary. If a user wants to release disk 25 manually, the disk 25 is to be actuated at its inner hole so that its outer rim 93 urges holding projections 92 in order to swing holders 108' to an open position.

The invention provides for a versatile disk container and magazine player system, allowing to store disks at high density, to give access to disks while preventing disks to unintentionally fall out, to reduce the size of a magazine player and to add the magazine and tray load and unload mechanism to many given types of disk drive, independent of its dimensional properties. Elements of container and tray are proposed according to the invention thus to fit within the extremely low height as well as small width and depth dimensions but also provide for reliable, stable, quick and user friendly working.

The invention claimed is:

1. Container for optical disks comprising one or more slidable trays, guiding means for guiding said tray, a cover plate and a bottom plate, wherein the sum of the heights of the one or more slidable trays is less than the height of said container, and wherein the sum of thicknesses of said cover plate and said bottom plate equals the thickness of said tray such that the distance between any two trays is an integer multiple of the thickness of said tray if two or more containers are stacked.

2. Container according to claim 1, wherein it contains three trays.

3. Container according to claim 1, wherein the outer dimensions of the container substantially equal those of a standard DVD storage box.

4. Container according to claim 1, wherein it comprises an opening for storing additional items.

5. Container according to claim 1, wherein the dimensions of bottom plate, cover plate and trays, at the outer surfaces, are dimensioned such to ensure dust protection.

6. Container according claim 1, wherein it is open on both sides for play back.

7. Container according to claim 1, wherein it is open at one side for insertion and removal of a tray and that it is partially closed at the opposite side.

8. Container according to claim 1, wherein it comprises releasable locking means for locking the trays in their position within the container.

9. Container according claim 1, wherein it comprises an opening for releasing said locking means.

10. Container according to claim 1, wherein it comprises an orientation groove.

11. Container according to claim 1, wherein it contains an identification area.

12. Container for optical disks according to claim 1, wherein it comprises support areas of defined thickness.

13. Container according to claim 1, wherein it comprises connecting means for connecting two or more of said containers to each other.

14. Container according to claim 13, wherein the connecting means is one of clips, hinges, pins and magnets.

15. Container according to claim 1, wherein it comprises a read-write protection means.

16. Container according to claim 1, wherein at least one of cover plate and bottom plate is made of transparent material.

17. Container according to claim 1, wherein at least one of cover plate and bottom plate comprises a label area.

18. Container according to claim 1, wherein it is, in top view, of rectangular shape, having first and second base lines, the first base line being shorter than the second base line, the first base line being less than 5% larger than the diameter of the largest optical disk to be stored within the container, the second base line being less than 20% larger than the diameter of the largest optical disk to be stored within the container, the container having side walls being arranged at the outer ends of the second base line end extending in direction of the first base line, the container having openings being arranged between said side walls and extending along the second base line, said openings being closed by side surfaces of trays which are accommodated within the container, said side surfaces of said trays, and surfaces of side walls and end surfaces of bottom plate and cover plate forming a substantially even plane.

19. Container according to claim 1, wherein a first locking means is arranged to lock and unlock all of the trays stored within the container, and a second locking means is provided for locking and releasing each single tray independently of the other trays.

20. Container according to claim 1, wherein it comprises a centering element for centering a play back device with regard to the trays.

21. Tray for container for optical disk, preferably according to claim 20, comprising a support area for supporting an optical disk at the lower surface of its outer rim and a releasable disk holder for holding an optical disk at the upper surface of its outer rim.

22. Tray according to claim 21, wherein the disk holder is arranged to perform one of swinging movement and rotating movement.

23. Container for optical disks according to claim 1, wherein said tray comprises gripping holes, a support area for supporting an optical disk at the lower surface of its outer rim, an opening in said support area for enabling access up to the radially outwardly area of an optical disk, the upper surface of said support area rising in cross sectional view from its radially inner end to its radially outer end, guiding means for guiding the tray within the container and an orientation hole.

24. Tray according to claim 23, wherein the disk holder is applied with a position fixing means.

25. Tray according to claim 23, wherein the disk holder has a first actuating face for being actuated by first actuating means and a second actuating face for being actuated by second actuating means.

26. Tray according to claim 23, wherein the disk holder has a first actuation edge for being actuated in a disk release position and a second actuation edge for being actuated in a disk holding position.

27. Tray according to claim 23, wherein the disk holder comprises two arms being pivotably connected to the tray one of the arms having a disk holding area and each arm having an actuation edge.

28. Adapter for a tray according to claim 23 of a disk storage container, comprising an outer shape to fit in said tray, gripping holes and inner support area for supporting an optical disk at the lower surface of its outer rim, an outer support area for being supported by a support area of said tray, the upper surface of said inner support area rises in cross sectional view from its radially inner end to its radially outer end, an opening in said support area enabling access to the radially outwardly area of a disk, the adapter being asymmetric.

29. Adapter for a tray of a disk storage container, preferably according to claim 28, comprising a releasable disk holder for holding an optical disk at the upper surface of its outer rim.

30. System including a container according to claim 1 and a magazine type player and/or recorder for use with said container, said magazine type player and/or recorder comprising an optical pick-up unit, a magazine for accommodating at least one container, the magazine tray having an orientation rib, and a slider for removing a single slidable tray out of said container into a tray receiving portion of said optical pick-up unit, said slider and said optical pick-up unit forming a single vertically movable unit.

31. System according to claim 30, wherein said magazine type player and/or recorder comprises a drawer for receiving one of a single disk and a cartridge and a tray from a container.

32. Magazine type player according to claim 30, wherein said slider comprises a push-pull element.

33. Magazine type player according to claim 30, wherein said slider comprises a pushing element and a push-pull element.

34. Magazine type player according to claim 33, wherein said push-pull element comprises a pull lever having a pulling nose and being guided into a contact position by a guiding element of the tray.

35. Magazine type player according to claim 33, wherein the push-pull element comprises a push nose.

36. Magazine type player according to claim 33, wherein the pushing element is connected to pushing means.

37. Magazine type player according to claim 33, wherein the pushing element is provided with a sensor for sensing a movement of the pushing element.

38. Magazine type player according to claim 33, wherein the pushing element comprises a sensor for sensing contact with an element of the container.

39. Magazine type player according to claim 30, wherein the orientation rib and the pulling nose reach into an orientation groove of a container.

40. Magazine type player according to claim 30, wherein the tray receiving portion comprises a guiding slot for adjusting the vertical tray position.

41. Magazine type player according to claim 1, wherein second sliding means and second optical pick-up means are provided wherein said second sliding means being arranged for moving a tray to or removing a tray from said second optical pick-up unit means.

42. Magazine type player according to claim 30, wherein said tray receiving portion comprises a tray holder for holding a tray in a remote position from the disk play position.

43. Magazine type player according to claim 30, wherein said tray receiving portion comprises a disk release pin for releasing the disk from its position at the tray.

44. Magazine type player according to claim 30, wherein said tray receiving portion comprises a disk release ring for actuating a disk release pin.

45. Magazine type player according to claim 30, comprising means for reading out or writing into an identification area of said container.

46. Magazine type player according to claim 30, comprising means for storing and keeping said read out information.

47. Magazine type player according to claim 30, comprising means for creating for and assigning to a container a unique identification code.

48. Magazine type player according to claim 30, wherein the optical pick-up unit comprises two optical scanner, for accessing top side and bottom side of an optical disk at one time.

49. Magazine type player according to claim 30, wherein it comprises a transparent window for enabling view to container being stored within said player.

50. Magazine type player according to claim 30, wherein said pushing element is provided with a first leg for co-acting with said slider and with a second leg for co-acting with said tray wherein said second leg is arranged to contact said tray substantially in the middle area of said tray.

* * * * *